US008107987B2

(12) United States Patent
Malladi et al.

(10) Patent No.: US 8,107,987 B2
(45) Date of Patent: Jan. 31, 2012

(54) APPARATUS AND METHOD FOR UPLINK POWER CONTROL OF WIRELESS COMMUNICATIONS

(75) Inventors: Durga Prasad Malladi, San Diego, CA (US); Juan Montojo, San Diego, CA (US); Aleksandar Damnjanovic, Del Mar, CA (US); Sai Yiu Duncan Ho, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 882 days.

(21) Appl. No.: 12/030,784

(22) Filed: Feb. 13, 2008

(65) Prior Publication Data

US 2008/0200203 A1 Aug. 21, 2008

Related U.S. Application Data

(60) Provisional application No. 60/889,933, filed on Feb. 14, 2007.

(51) Int. Cl.
*H04B 7/00* (2006.01)
(52) U.S. Cl. .................... 455/522; 455/127.1; 455/13.4; 370/318
(58) Field of Classification Search ............... 455/550.1, 455/553.1, 115.1, 127.1, 67.11, 522, 13.4; 370/328, 342, 311, 310, 329, 335, 318
See application file for complete search history.

(56) References Cited

U.S. PATENT DOCUMENTS

| | | | | |
|---|---|---|---|---|
| 6,636,746 | B1 * | 10/2003 | Hashem et al. | 455/522 |
| 7,136,483 | B2 * | 11/2006 | Khaleghi et al. | 379/448 |
| 7,924,751 | B2 * | 4/2011 | Dean | 370/279 |
| 7,929,498 | B2 * | 4/2011 | Ozluturk et al. | 370/335 |
| 2002/0082040 | A1 * | 6/2002 | Ozluturk et al. | |
| 2002/0111183 | A1 | 8/2002 | Lundby | |
| 2003/0027587 | A1 * | 2/2003 | Proctor, Jr. | 455/522 |
| 2003/0232622 | A1 | 12/2003 | Seo et al. | |
| 2008/0186892 | A1 * | 8/2008 | Damnjanovic | 370/311 |
| 2010/0260086 | A1 * | 10/2010 | Santhanam et al. | 370/311 |

FOREIGN PATENT DOCUMENTS

| | | |
|---|---|---|
| RU | 2251220 | 4/2005 |
| RU | 2280328 C2 | 7/2006 |
| RU | 2263403 * | 12/2007 |

(Continued)

OTHER PUBLICATIONS

International Search Report—PCT/US2008/053919, International Searching Authority—European Patent Office—Oct. 16, 2008.

(Continued)

*Primary Examiner* — Sujatha Sharma

(57) ABSTRACT

Systems and methodologies are described that facilitate employing periodic closed loop power control corrections in a wireless communication environment. A periodic power control command can be sent over a downlink to control and/or correct an uplink power level employed by an access terminal. Each periodic power control command can be generated based upon an uplink periodic transmission sent from the access terminal. The periodic power control commands can be communicated via a Physical Downlink Control Channel (PDCCH) or in-band signaling. Moreover, access terminals can be grouped to enhance efficiency of downlink transfer of the periodic power control commands. The periodic power control commands can be halted upon access terminal uplink resources being deallocated. For instance, these resources can be deallocated after an inactivity period of the access terminal. Thereafter, the access terminal can initiate random access (e.g., leveraging open loop mechanisms) to resume periodic power control command transmission.

88 Claims, 15 Drawing Sheets

FOREIGN PATENT DOCUMENTS

| | | | |
|---|---|---|---|
| WO | WO0079711 | | 12/2000 |
| WO | WO02101941 | * | 12/2002 |
| WO | 03017688 | | 2/2003 |
| WO | WO03044970 | * | 5/2003 |
| WO | WO03067789 A1 | | 8/2003 |
| WO | WO2006019287 A1 | | 2/2006 |

OTHER PUBLICATIONS

Written Opinion—PCT/US2008/053919, International Searching Authority—European Patent Office—Oct. 16, 2008.

* cited by examiner

APPARATUS AND METHOD FOR UPLINK POWER CONTROL OF WIRELESS COMMUNICATIONS

CROSS-REFERENCE TO RELATED APPLICATIONS

This application claims the benefit of U.S. Provisional Patent application Ser. No. 60/889,933 entitled "A METHOD AND APPARATUS FOR POWER CONTROL IN LTE" which was filed Feb. 14, 2007. The entirety of the aforementioned application is herein incorporated by reference.

BACKGROUND

I. Field

The following description relates generally to wireless communications, and more particularly to controlling uplink (UL) power levels employed by access terminals in a Long Term Evolution (LTE) based wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), Single Carrier Frequency Division Multiplexing (SC-FDM), and others. Additionally, the system can conform to specifications such as third generation partnership project (3GPP), 3GPP long term evolution (LTE), etc.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-input-single-output (SISO), multiple-input-single-output (MISO), single-input-multiple-output (SIMO) or a multiple-input-multiple-output (MIMO) system.

Wireless communication systems oftentimes employ one or more base stations and sectors therein that provide a coverage area. A typical sector can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal. With many access terminals transmitting signal data in proximity, power control is important for yielding sufficient signal to noise ratios (SNRs) at different data rates and transmission bandwidths for communications over the uplink. It is desirable to keep the overhead incurred from the transmission of the power adjustments to these access terminals as low as possible while achieving the aforementioned goals.

SUMMARY

In accordance with one or more embodiments and corresponding disclosure thereof, various aspects are described in connection with facilitating employment of periodic closed loop power control corrections in a wireless communication environment. A periodic power control command can be sent over a downlink to control and/or correct an uplink power level employed by an access terminal. Each periodic power control command can be generated based upon an uplink periodic transmission sent from the access terminal. The periodic power control commands can be communicated via a Physical Downlink Control Channel (PDCCH) or in-band signaling. Moreover, access terminals can be grouped to enhance efficiency of downlink transfer of the periodic power control commands. The periodic power control commands can be halted upon access terminal uplink resources being deallocated. For instance, these resources can be deallocated after an inactivity period of the access terminal. Thereafter, the access terminal can initiate random access (e.g., leveraging open loop mechanisms) to resume periodic power control command transmission.

According to related aspects, a method that facilitates generating periodic power control commands in a wireless communication environment is described herein. The method can include transmitting periodic power control commands to an access terminal in response to received periodic signals from the access terminal. Further, the method can comprise deallocating uplink resources for the access terminal after an inactivity period of the access terminal. Moreover, the method can include adjusting an uplink power level when the access terminal resumes uplink transmissions. The method can also include resuming transmission of periodic power control commands to the access terminal in response to received periodic signals from the access terminal.

Another aspect relates to a wireless communications apparatus. The wireless communications apparatus can include a memory that retains instructions related to sending periodic power control commands to an access terminal in response to received periodic uplink transmissions from the access terminal, deallocating uplink resources for the access terminal after an inactivity period of the access terminal, controlling alteration of an uplink power level upon resuming of uplink transmissions from the access terminal, and resuming transfer of periodic power control commands to the access terminal in response to received periodic uplink transmissions from the access terminal. Further, the wireless communications apparatus can include a processor, coupled to the memory, configured to execute the instructions retained in the memory.

Yet another aspect relates to a wireless communications apparatus that enables yielding periodic power control commands for utilization by access terminals in a wireless communication environment. The wireless communications apparatus can include means for sending periodic power control commands to an access terminal based upon evaluation of respective received periodic signals. Further, the wireless communications apparatus can include means for deallocating physical uplink resources for the access terminal after an inactivity period of the access terminal. Moreover, the wireless communications apparatus can comprise means for altering an uplink power level upon the access terminal resuming uplink transmissions. Additionally, the wireless communications apparatus can include means for resuming transfer of periodic power control commands to the access terminal based on the received periodic signals.

Still another aspect relates to a machine-readable medium having stored thereon machine-executable instructions for transmitting periodic power control commands to an access terminal in response to received periodic uplink transmissions from the access terminal; deallocating uplink resources for the access terminal after an inactivity period of the access terminal; controlling alteration of an uplink power level upon resuming of uplink transmissions from the access terminal; and resuming transmission of periodic power control commands to the access terminal in response to received periodic uplink transmissions from the access terminal.

In accordance with another aspect, an apparatus in a wireless communication system can include a processor, wherein the processor can be configured to transmit periodic power control commands to an access terminal in response to received periodic signals from the access terminal. Further, the processor can be configured to deallocate uplink resources for the access terminal after an inactivity period of the access terminal. Moreover, the processor can be configured to control adjustment of an uplink power level when the access terminal resumes uplink transmissions. Additionally, the processor can be configured to restart transmission of periodic power control commands to the access terminal in response to received periodic signals from the access terminal.

According to other aspects, a method that facilitates utilizing periodic power control commands in a wireless communication environment is described herein. The method can include sending periodic transmissions over an uplink. Further, the method can include receiving periodic power control commands in response to each of the periodic transmissions. The method can additionally comprise transitioning to a state where uplink dedicated resources are released. Also, the method can include resuming uplink transmission. Moreover, the method can include resuming the periodic transmissions over the uplink and receipt of the responsive, periodic power control commands.

Yet another aspect relates to a wireless communications apparatus that can include a memory that retains instructions related to transferring periodic transmissions over an uplink, obtaining periodic power control commands each generated based upon the periodic transmissions, transitioning to a state where uplink dedicated resources are released from an access terminal, resuming uplink transmission, and restarting the periodic transmissions over the uplink and receipt of the periodic power control commands. Further, the wireless communications apparatus can comprise a processor, coupled to the memory, configured to execute the instructions retained in the memory.

Another aspect relates to a wireless communications apparatus that enables utilizing periodic power control commands in a wireless communication environment. The wireless communications apparatus can include means for transferring periodic transmissions over an uplink to obtain respective, periodic power control commands in response. Moreover, the wireless communications apparatus can include means for switching to a state where physical uplink dedicated resources are released. The wireless communications apparatus can also comprise means for resuming uplink transmission. Further, the wireless communications apparatus can include means for resuming the periodic transmissions over the uplink and receipt of the respective, periodic power control commands.

Still another aspect relates to a machine-readable medium having stored thereon machine-executable instructions for transferring periodic Sounding Reference Signal (SRS) transmissions over an uplink; obtaining periodic power control commands each generated based upon the periodic transmissions; transitioning to a state where uplink dedicated resources are released from an access terminal; resuming uplink transmission; and restarting the periodic transmissions over the uplink and receipt of the periodic power control commands.

In accordance with another aspect, an apparatus in a wireless communication system can include a processor, wherein the processor can be configured to send periodic transmissions over an uplink. Further, the processor can be configured to receive periodic power control commands in response to each of the periodic transmissions. Additionally, the processor can be configured to transition to a state where uplink dedicated resources are released. Moreover, the processor can be configured to resume uplink transmission. The processor can also be configured to resume the periodic transmissions over the uplink and receipt of the responsive, periodic power control commands.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
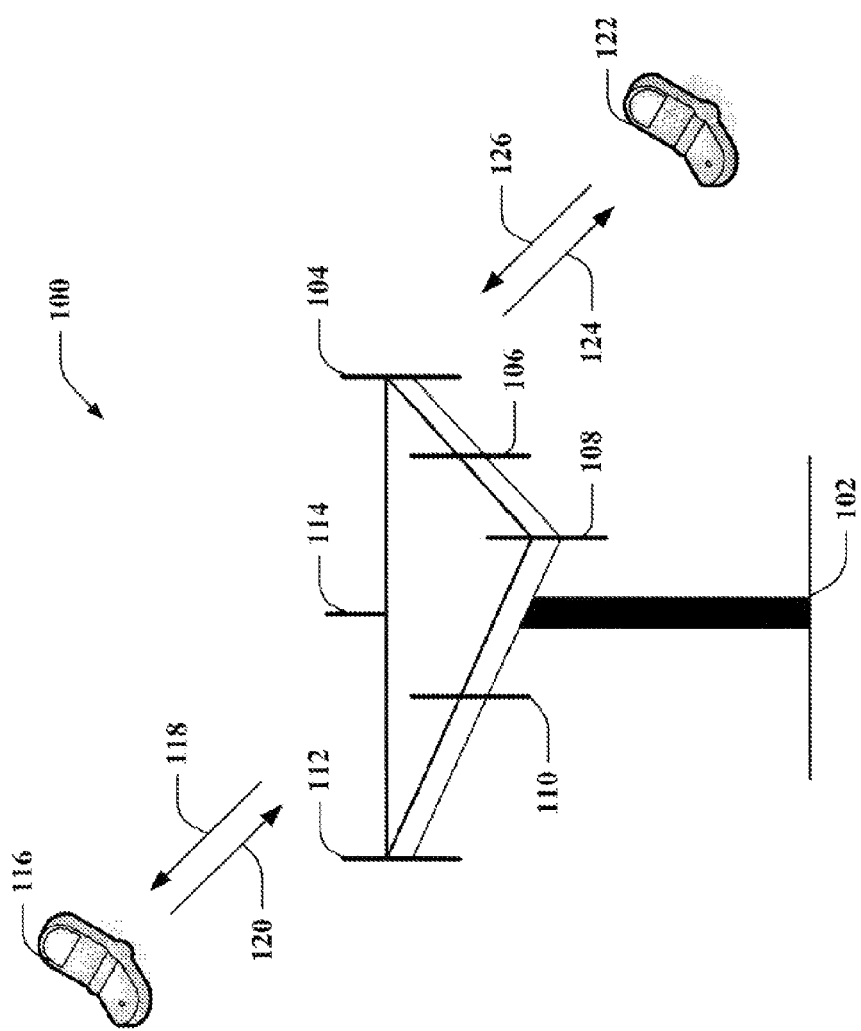
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, eNode B (eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

The corresponding sector of base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102, or as a cell of an eNB. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can be a Long Term Evolution (LTE) based system, for instance. In such system 100, the corresponding sectors of base station 102 can control uplink power levels utilized by access terminals 116 and 122. Hence, system 100 can provide uplink (UL) power control which yields compensation of path loss and shadowing (e.g., path loss and shadowing can slowly change over time) and compensation of time-varying interference from adjacent cells (e.g., since system 100 can be an LTE based system that utilizes frequency reuse 1). Moreover, system 100 can mitigate large variations of receive power obtained at base station 102 across users (e.g., since the users can be multiplexed within a common band). Further, system 100 can compensate for multipath fading variations at sufficiently low speeds. For instance, the coherence time of the channel for 3 km/h at different carrier frequencies can be as follows: a carrier frequency of 900 MHz can have a coherence time of 400 ms, a carrier frequency of 2 GHz can have a coherence time of 180 ms, and a carrier frequency of 3 GHz can have a coherence time of 120 ms. Thus, depending on latency and periodicity of adjustments, fast fading effects can be corrected with low Doppler frequencies.

System 100 can employ uplink power control that combines open loop and closed loop power control mechanisms. According to an example, open loop power control can be utilized by each access terminal 116, 122 for setting power levels of a first preamble of a Random Access Channel (RACH) communication. For the first preamble of a RACH, each access terminal 116, 122 may have obtained downlink (DL) communication(s) from base station 102, and the open loop mechanism can enable each access terminal 116, 122 to select an uplink transmit power level that is inversely proportional to a receive power level related to the obtained downlink communication(s). Thus, knowledge of the downlink can be utilized by access terminals 116, 122 for uplink transmissions. The open loop mechanism can allow for very fast adaptation to severe changes of radio conditions (e.g., depending on receive power filtering) by way of instantaneous power adjustments. Further, the open loop mechanism can continue to operate beyond the RACH processing in contrast to conventional techniques oftentimes employed. The closed loop mechanism can be utilized by system 100 once the random access procedure has succeeded. For example, closed loop techniques can be employed when periodic uplink resources have been allocated to access terminals 116, 122 (e.g., the periodic uplink resources can be Physical Uplink Control Channel (PUCCH) or Sounding Reference Signal (SRS) resources). Moreover, the corresponding sectors in base station 102 (and/or a network) can control uplink transmit power utilized by access terminals 116, 122 based upon the closed loop control.

The closed loop mechanism employed by system 100 can be periodic, aperiodic or a combination of the two. Periodic closed-loop corrections can be transmitted by the corresponding sector in base station 102 to access terminals 116, 122 periodically (e.g., once every 0.5 ms, 1 ms, 2 ms, 4 ms, . . . ). For instance, the periodicity can be dependent upon periodicity of uplink transmissions. Moreover, the periodic corrections can be single-bit corrections (e.g., up/down, ±1 dB, . . . ) and/or multi-bit corrections (e.g., ±1 dB, ±2 dB, ±3 dB, ±4 dB, . . . ). Thus, the power control step and the periodicity of corrections can determine a maximum rate of change of uplink power that the corresponding sector in base station 102 (and/or the network) can control. According to another example, aperiodic corrections can be sent from the corresponding sector in base station 102 to corresponding access terminals 116, 122 as needed. Following this example, these corrections can be transmitted aperiodically when triggered by a network measurement (e.g., receive (RX) power outside a set margin, opportunity to send control information to a given access terminal, . . . ). Moreover, aperiodic corrections can be single-bit and/or multi-bit (e.g., the corrections can be multi-bit since a significant portion of overhead associated with aperiodic corrections can relate to correction scheduling rather than correction size). According to yet another example, the aperiodic corrections can be transmitted by the corresponding sector in base station 102 to access terminals 116, 122 in addition to periodic corrections in order to minimize the overhead incurred with the transmission of these power adjustments.

Figure 2:
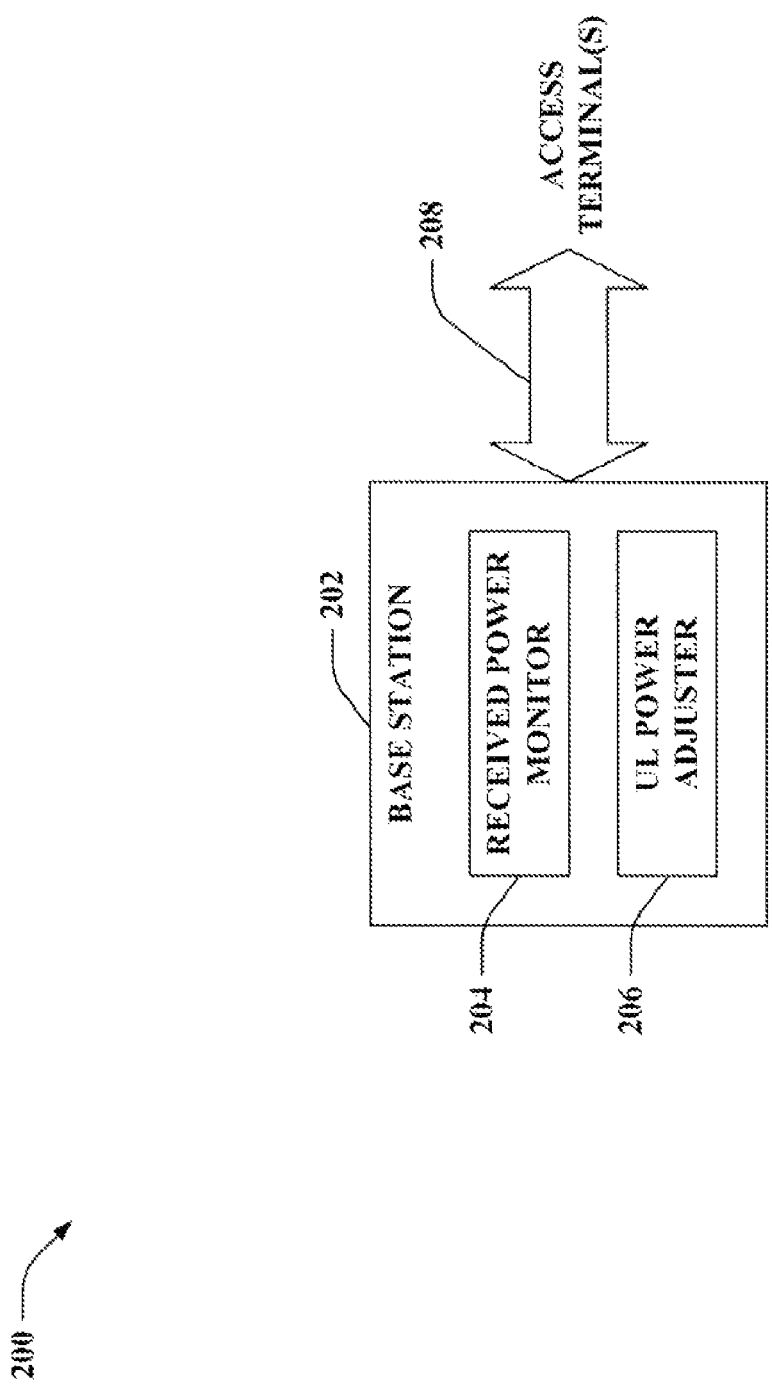
FIG. 2 is an illustration of an example system that controls uplink power level(s) employed by access terminal(s) in an LTE based wireless communication environment.

Now turning to FIG. 2, illustrated is a system 200 that controls uplink power level(s) employed by access terminal(s) in an LTE based wireless communication environment. System 200 includes a sector in a base station 202 that can communicate with substantially any number of access terminal(s) (not shown). Moreover, the sector in base station 202 can include a received power monitor 204 that evaluates power level(s) associated with uplink signal(s) obtained from access terminal(s). Further, the sector in base station 202 can comprise an uplink (UL) power adjuster 206 that utilizes the analyzed power level(s) to generate command(s) to alter access terminal power levels.

Various physical (PHY) channels 208 can be leveraged for communication between base station 202 and the access terminal(s); these physical channels 208 can include downlink physical channels and uplink physical channels. Examples of downlink physical channels include Physical Downlink Control Channel (PDCCH), Physical Downlink Shared Channel (PDSCH), and Common Power Control Channel (CPCCH). PDCCH is a DL layer 1/layer 2 (L1/L2) control channel (e.g., assigning PHY layer resources for DL or UL transmission) that has a capacity of around 30-60 bits and is cyclic redundancy check (CRC) protected. PDCCH can carry uplink grants and downlink assignments. PDSCH is a DL shared data channel; PDSCH can be a DL data channel shared amongst different users. CPCCH is transmitted on the DL for UL power controlling multiple access terminals. Corrections sent on the CPCCH can be single-bit or multi-bit. Further, the CPCCH can be a particular instantiation of the PDCCH. Examples of uplink physical channels include Physical Uplink Control Channel (PUCCH), Physical Uplink Shared Channel (PUSCH), Sounding Reference Signal (SRS), and Random Access Channel (RACH). PUCCH includes the report of Channel Quality Indicator (CQI) channel, the ACK channel and the UL requests. PUSCH is an UL shared data channel. The SRS can lack information and can enable sounding the channel on the UL to allow for the channel to be sampled over part or the full system bandwidth. It is to be appreciated that the claimed subject matter is not limited to these example physical channels 208.

Received power monitor 204 and UL power adjuster 206 can provide closed loop power control for uplink transmissions effectuated by access terminal(s). Operation on the LTE system can entail transmissions at a given time over bandwidths that can be significantly less than the entirety of the bandwidth of system 200. Each access terminal can transmit over a small portion of the entire bandwidth of system 200 at a given time. Moreover, frequency hopping can be employed by the access terminals; thus, the corresponding sector in base station 202 can encounter difficulty when attempting to evaluate adjustments to make to uplink power levels of the access terminals. Therefore, an adequate closed loop power control mechanism provided by received power monitor 204 and UL power adjuster 206 constructs a wideband receive power estimate from transmissions over possibly multiple instants and on possibly multiple UL PHY channels enabling adequate correction of the path loss and shadowing effects irrespective of access terminal transmission bandwidth at any time.

Received power monitor 204 constructs the wideband receive power estimate from the sampling of the channel based upon access terminal transmissions in a variety of manners. For instance, received power monitor 204 can employ the PUSCH for sampling. Following this example, the transmission band of the PUSCH is localized on a given slot. Frequency diverse scheduling can apply a pseudo-random hopping pattern to the transmission band at slot boundaries and possibly over re-transmissions to fully exploit the frequency diversity. PUSCH transmissions exploiting frequency selective scheduling will not apply a frequency hopping pattern onto the transmit data and therefore may require a long time in order to sample the channel at all (or most) frequencies. Moreover, frequency selective scheduling can leverage transmission of an SRS or PUCCH. Frequency selective scheduling is a scheduling strategy exploiting the selectivity of the channel; for instance, frequency selective scheduling attempts to confine transmissions onto the best sub-bands. This scheduling strategy can be relevant for low mobility access terminals. Further, these transmissions are usually exclusive of frequency hopping techniques. Frequency diverse scheduling is a disparate scheduling strategy employing the entire system bandwidth (e.g., modulo the minimum transmit bandwidth capability, . . . ) to naturally obtain frequency diversity. Transmissions associated with frequency diverse scheduling can be associated with frequency hopping. Moreover, frequency hopping can include changing the transmit frequency of a waveform in a pseudo-random manner to exploit frequency diversity from the point of view of a channel as well as interference.

According to another example, received power monitor 204 can utilize the PUCCH for sampling the UL channel and therefore to construct the wideband receive power estimate. The transmission band of the PUCCH can also be localized on a given slot with hopping at the slot boundary on each transmission time interval (TTI). An occupied band can depend on whether there is PUSCH transmission on a particular TTI. When PUSCH is transmitted over a given TTI, the control information that would be transmitted over PUCCH can be transmitted in-band with the remainder of the data transmission (e.g., to retain the single-carrier property of the UL waveform) over PUSCH. When PUSCH is not transmitted over a particular TTI, the PUCCH can be transmitted over a localized band set aside for transmission of the PUCCH at the edges of the system band.

Pursuant to another illustration, SRS transmissions can be utilized by received power monitor 204 to sample the channel and construct the wideband receive power estimate. The transmission band (over time) of the SRS can be substantially equal to the entire system band (or the minimum access terminal transmit bandwidth capability). At a given SC-FDMA symbol (e.g., SC-FDMA symbol is a minimum unit of transmission on the UL of LTE), the transmission can be localized (e.g., spanning a set of consecutive subcarriers that hops over time) or distributed (e.g., spanning the entire system band or a portion thereof, which may or may not hop, . . . ).

Received power monitor 204 constructs the wideband receive power estimate from sampling of the channel over the entire system bandwidth. However, depending upon the manner by which the channel is sampled and/or whether frequency hopping is applied to the transmissions, the time span to construct the wideband receive power estimate from the sampling of the UL channel by received power monitor 204 can vary.

PUCCH transmissions when there is no UL data take place at the edges of the system band. PUCCH transmission where there is UL data can be located in-band with the data transmission over the PUSCH. Further, PUSCH transmissions may not change transmit frequency or may not be hopping at all to exploit UL frequency selective scheduling; however, to enable frequency selective scheduling, SRS transmissions can be leveraged for FDD/TDD systems. Moreover, when the PUSCH uses frequency diverse scheduling, frequency hopping is applied to transmissions.

Moreover, based upon the channel sampling effectuated by received power monitor 204, UL power adjuster 206 can generate a command that can alter the UL power level employed by a particular access terminal. The command can be a single-bit correction (e.g., up/down, ±1 dB, . . . ) and/or a multi-bit correction (e.g., ±1 dB, ±2 dB, ±3 dB, ±4 dB, . . . ). Further, UL power adjuster 206 (and/or the sector in the corresponding base station 202) can transmit the generated command to the access terminal to which the command is intended.

Further, the access terminal(s) can each be associated with a particular state at a given time. Examples of access terminal states include LTE_IDLE, LTE_ACTIVE and LTE_ACTIVE_CPC. However, it is to be appreciated that the claimed subject matter is not limited to these illustrative states.

LTE_IDLE is an access terminal state where the access terminal does not have a unique cell ID. While in the LTE_IDLE state, the access terminal can lack a connection to base station 202. Further, transitioning to LTE_ACTIVE state from LTE_IDLE can be effectuated via utilization of RACH.

LTE_ACTIVE is an access terminal state where the access terminal has a unique cell ID. Further, when in LTE_ACTIVE state, the access terminal can actively transfer data via the uplink and/or downlink. Access terminals in this state have UL dedicated resources (e.g., CQI, SRS that are transmitted periodically, . . . ). According to an example, access terminals in the LTE_ACTIVE state can employ discontinuous transmission/discontinuous reception (DTX/DRX) procedures with a cycle not expected to be much longer than approximately 20 ms or 40 ms. Access terminals in this state start PUSCH transmissions either directly in response to DL activity (e.g., with possibly an UL grant in-band with DL data or through the PDCCH) or by sending an UL request over the PUCCH. Further, users in this state can be access terminals with an active exchange of UL/DL data taking place or access terminals running a high Grade of Service (GoS) application (e.g., Voice over Internet Protocol (VoIP), . . . ).

LTE_ACTIVE_CPC (Continuous Packet Connectivity) is a substate of LTE_ACTIVE where access terminals retain their unique cell ID but where the UL dedicated resources have been released. Utilization of LTE_ACTIVE_CPC enables extending battery life. Access terminals in this substate start transmissions either in response to DL activity (e.g., with possibly an UL grant in-band with DL data or through the PDCCH, . . . ) or by sending an UL request over the RACH. The initial transmit power can be either based on an open loop mechanism (e.g., response to DL activity) or a last successful preamble (e.g., RACH).

Figure 3:
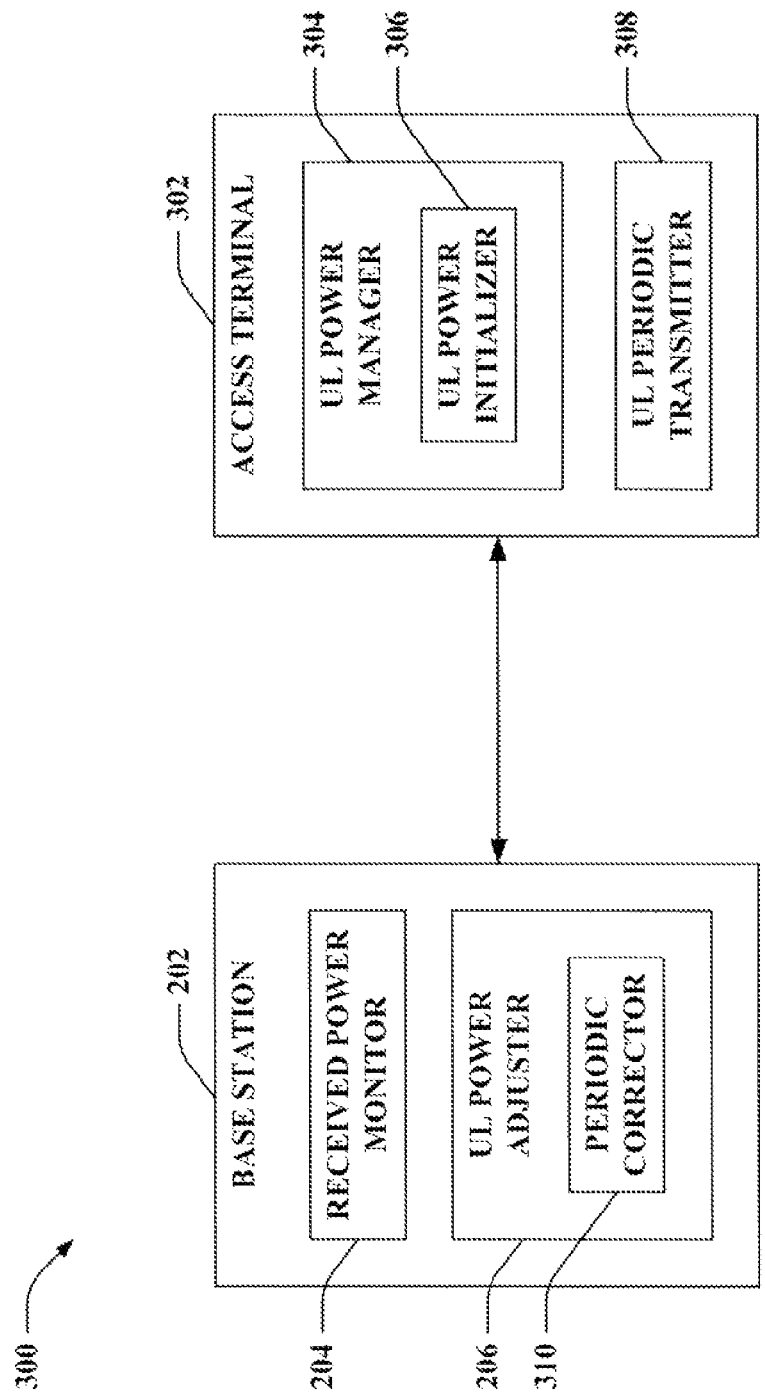
FIG. 3 is an illustration of an example system that periodically corrects an uplink power level employed by an access terminal.

Referring to FIG. 3, illustrated is a system 300 that periodically corrects an uplink power level employed by an access terminal. System 300 includes base station 202 that communicates with an access terminal 302 (and/or any number of disparate access terminals (not shown)). Access terminal 302 comprises an UL power manager 304, which further includes an UL power initializer 306. Moreover, access terminal 302 includes an UL periodic transmitter 308. Base station 202 further includes received power monitor 204 and UL power adjuster 206; received power monitor 204 further comprises aperiodic corrector 310.

Periodic corrector 310 generates periodic power control commands (e.g., periodic transmission power control (TPC) commands, periodic corrections, . . . ) to be transferred to access terminal 302. Further, periodic corrector 310 can transmit the periodic power control commands to access terminal 302 (and/or any disparate access terminal(s)) with any periodicity (e.g., 0.5 ms, 1 ms, 2, ms, 4 ms, . . . ); however, it is contemplated that UL power adjuster 206 and/or base station 202 can transmit such periodic power control commands. Further, periodic corrector 310 can yield a single-bit correction (e.g., up/down, ±1 dB, . . . ) and/or a multi-bit correction (e.g., ±1 dB, ±2 dB, ±3 dB, ±4 dB, . . . ). For example, if the periodic corrections are sent from periodic corrector 310 at a higher frequency, then single-bit corrections can be more likely to be employed, and vice versa.

UL power manager 304 controls the uplink power level employed by access terminal 302 for uplink transmissions. UL power manager 304 can receive the periodic power control commands from base station 202 and alter the uplink power level utilized for transmission based upon the obtained commands. According to another illustration, UL power initializer 306 can set an initial uplink transmit power. UL power initializer 306 can employ an open loop mechanism to determine the initial uplink transmit power based upon downlink activity, for example. Additionally or alternatively, UL power initializer 306 can assign the initial uplink power level to a power level associated with a previous (e.g., immediately prior, . . . ) successful preamble (e.g., RACH).

UL periodic transmitter 308 can send periodic transmissions over the uplink to base station 202. For instance, UL periodic transmitter 308 can operate while access terminal 302 is in LTE_ACTIVE state. Moreover, the periodic transmissions transferred by UL periodic transmitter 308 can be a set of SRS transmissions; however, it is to be appreciated that the claimed subject matter is not so limited as any type of periodic uplink transmission can be employed (e.g., periodic CQI transmissions, periodic PUCCH transmissions, . . . ). Thus, UL periodic transmitter 308 can send SRS transmissions over the uplink to sound the channel over the entire system bandwidth since the SRS transmissions can be sounding signals; therefore, at the same time as enabling uplink frequency selective scheduling, the sounding signal can be used to compute the closed loop corrections for UL power control. Transmissions sent by UL periodic transmitter 308 can be received and/or employed by received power monitor 204 of base station 202 in connection with sampling the channel. Moreover, UL power adjuster 206 and/or periodic corrector 310 can generate commands corresponding to such sampling.

According to an illustration, periodicity of UL transmissions sent by UL periodic transmitter 308 of access terminal 302 can be linked to DL TPC command transmission cycle employed by periodic corrector 310 for access terminal 302; hence, access terminals with differing UL transmission periodicity can be sent DL TPC commands with disparate transmission cycles. Further, the periodicity of UL transmissions can correlate to a number of bits allocated for access terminal power adjustments yielded by periodic corrector 310 employed for a particular access terminal (e.g., access terminal 302, . . . ). For example, a mapping between the number of bits allocated for uplink power control correction and an uplink periodic transmission rate (e.g., SRS transmission rate, PUCCH transmission rate, . . . ) can be predetermined. Following this example, an uplink periodic transmission rate of 200 Hz can map to 1 bit, a rate of 100 Hz can map to 1 bit, a rate of 50 Hz can map to 2 bits, a rate of 25 Hz can map to 2 bits, and a rate of 0 Hz can map to x>2 bits. According to the aforementioned example, the number of bits allocated for the power adjustments at the access terminal becomes larger as the uplink periodic transmission rate decreases. At the limit for an uplink periodic transmission rate of 0 Hz (e.g., no transmission of the SRS, PUCCH, . . . ), the power adjustment can be x>2 bits, which can be the case of open loop transmissions with closed loop adjustments on an as needed basis.

Periodic corrector 310 can send corrections on aperiodic basis to substantially all users in LTE_ACTIVE state associated with base station 202. Pursuant to an example, users to which periodic corrector 310 sends commands can be grouped based upon, for example, GoS requirements, DRX/DTX cycle and offset, and so forth. The transmission of the power control commands for the group of users can be made by periodic corrector 310 on a particular instantiation of the PDCCH that can be denoted CPCCH or TPC-PDCCH. According to another illustration, periodic corrector 310 can utilize in-band signaling to a group of users, where the size of the group can be greater than or equal to 1. Overhead associated with periodic correction can be based on a number of bits that the correction requires and the associated control (if any) required to convey the information to the relevant access terminals.

For transfer of transmission power control (TPC) commands over the PDCCH by periodic corrector 310, a 32 bit payload and an 8 bit CRC can be employed. For instance, 32 single-bit TPC commands in a 1 ms interval can be used for one PDCCH instant. Thus, 320 users in LTE_ACTIVE state can be supported at 100 Hz using a single PDCCH on each TTI assuming FDD is employed. Accordingly, single bit corrections can be provided every 10 ms, which can allow for 100 dB/s corrections. According to another example, 16 dual-bit TPC commands can be employed in a 1 ms interval. Thus, 320 users can be supported in LTE_ACTIVE state with 50 Hz using a single PDCCH on each TTI assuming FDD is employed. Hence, dual bit corrections every 20 ms allow for 100 dB/s corrections.

Figure 4:
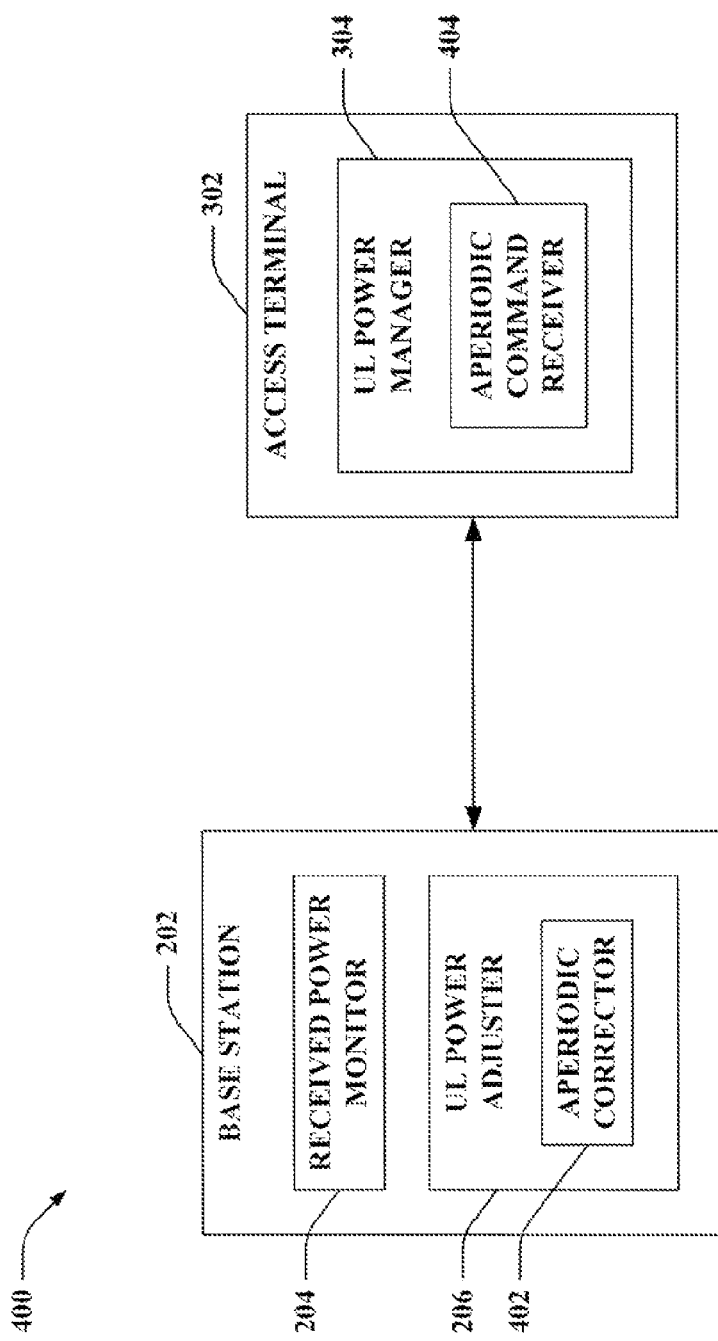
FIG. 4 is an illustration of an example system that aperiodically transfers power control commands to access terminals in an LTE based wireless communication environment.

Now turning to FIG. 4, illustrated is a system 400 that aperiodically transfers power control commands to access terminals in an LTE based wireless communication environment. System 400 includes base station 202 that communicates with access terminal 302 (and/or any number of differing access terminal(s) (not shown)). Base station 202 includes received power monitor 204 and UL power adjuster 206, which further comprises an aperiodic corrector 402. Moreover, access terminal 302 includes UL power manager 304, which further includes an aperiodic command receiver 404.

Aperiodic corrector 402 can generate a power control command directed towards access terminal 302 on an as needed basis. For instance, aperiodic corrector 402 can transmit aperiodically when triggered by a measurement (e.g., measurement of a condition recognized utilizing data from received power monitor 204 such as received power being outside of a set margin, . . . ). Aperiodic corrector 402 can determine that an uplink power level of access terminal 302 deviates from a target at a particular time; thus, aperiodic corrector 402 can send a command to adjust this power level in response. Further, aperiodic corrector 402 can yield a single-bit correction (e.g., up/down, ±1 dB, . . . ) and/or a multi-bit correction (e.g., ±1 dB, ±2 dB, ±3 dB, ±4 dB, . . . ).

Aperiodic command receiver 404 can obtain the corrections sent by aperiodic corrector 402 (and/or UL power adjuster 206 and/or corresponding sector in base station 202 in general). For instance, aperiodic command receiver 404 can decipher that a particular correction sent by the corresponding sector in base station 202 is intended for access terminal 302. Moreover, based upon the obtained corrections, aperiodic command receiver 404 and/or UL power manager 304 can alter an uplink power level employed by access terminal 302.

Aperiodic corrections of uplink power levels employed by access terminal 302 and yielded by aperiodic corrector 402 can be trigger based. Thus, the aperiodic corrections can be associated with larger overhead as compared to periodic corrections due to the unicast nature of the aperiodic corrections. Additionally, according to an example where multi-bit aperiodic corrections are employed, these corrections can be mapped to a particular instantiation of the PDCCH (e.g., in which case the power correction can be transmitted as part of the DL assignment or UL grant) or a PDCCH/PDSCH pair (e.g., in which case the power correction can be transmitted stand-alone or in-band with other data transmission).

Figure 5:
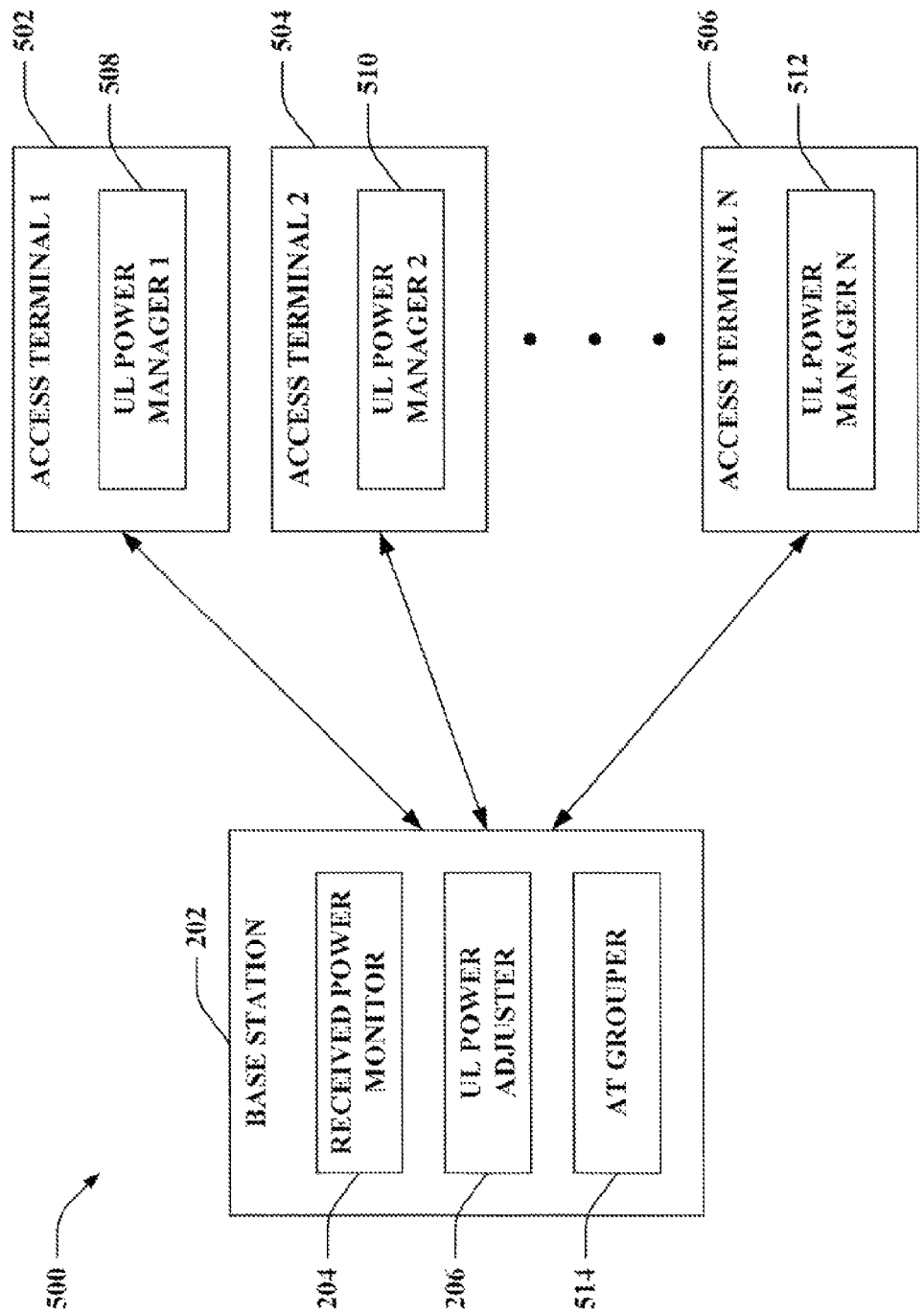
FIG. 5 is an illustration of an example system that groups access terminals for sending power control commands over a downlink.

Now referring to FIG. 5, illustrated is a system 500 that groups access terminals for sending power control commands over a downlink. System 500 includes base station 202 that communicates with an access terminal 1 502, an access terminal 2 504, ..., and an access terminal N 506, where N can be any integer. Each access terminal 502-506 can further include a respective UL power manager (e.g., access terminal 1 502 includes a UL power manager 1 508, access terminal 2 504 includes a UL power manager 2 510, ..., access terminal N 506 includes a UL power manager N 512). Moreover, the corresponding sector in base station 202 can comprise received power monitor 204, UL power adjuster 206 and an access terminal (AT) grouper 514 that combines a subset of access terminals 502-506 into a group for transmitting power control commands over the downlink.

AT grouper 514 can group access terminals 502-506 as a function of various factors. For instance, AT grouper 514 can assign one or more access terminals 502-506 to a group based upon DRX cycle and phase. Pursuant to another illustration, AT grouper 514 can allocate access terminal(s) 502-506 to groups based upon uplink periodic transmission rates (e.g., SRS transmission rate, PUCCH transmission interval, ...) employed by access terminals 502-506. By combining subsets of access terminals 502-506 into disparate groups, transmission of power control commands by UL power adjuster 206 on the DL over the PDCCH (or CPCCH) can be effectuated more efficiently (e.g., by sending power control commands for multiple access terminals grouped together in a common message). By way of example, AT grouper 514 can form groups for utilization with periodic uplink power control; however, the claimed subject matter is not so limited.

According to an illustration, access terminal 1 502 can employ a transmission rate of 200 Hz for SRS transmission, access terminal 2 504 can utilize a transmission rate of 50 Hz for SRS transmission, and access terminal N 506 can use a transmission rate of 100 Hz for SRS transmission. AT grouper 514 can recognize these respective transmission rates (e.g., utilizing signals obtained via received power monitor 204, ...). Thereafter, AT grouper 514 can assign access terminal 1 502 and access terminal N 506 to a group A (along with any other access terminal(s) that employ 100 Hz or 200 Hz transmission rates). AT grouper 514 can also allocate access terminal 2 504 (and any disparate access terminal(s) that employ 25 Hz or 50 Hz transmission rates) to a group B. It is to be appreciated, however, that the claimed subject matter is not limited to the aforementioned illustration. Further, AT grouper 514 can assign group IDs to each of the groups (e.g., for use on the PDCCH or CPCCH). Upon assigning access terminals 502-506 to respective groups, commands sent by UL power adjuster 206 can employ downlink resources corresponding to a particular group associated with an intended recipient access terminal. For instance, AT grouper 514 and UL power adjuster 206 can operate in conjunction to send TPC commands to multiple access terminals 502-506 in each PDCCH transmission. Moreover, each UL power manager 508-512 can recognize appropriate PDCCH transmission(s) to listen to for obtaining TPC command(s) directed thereto (e.g., based upon corresponding group IDs, ...).

Figure 6:
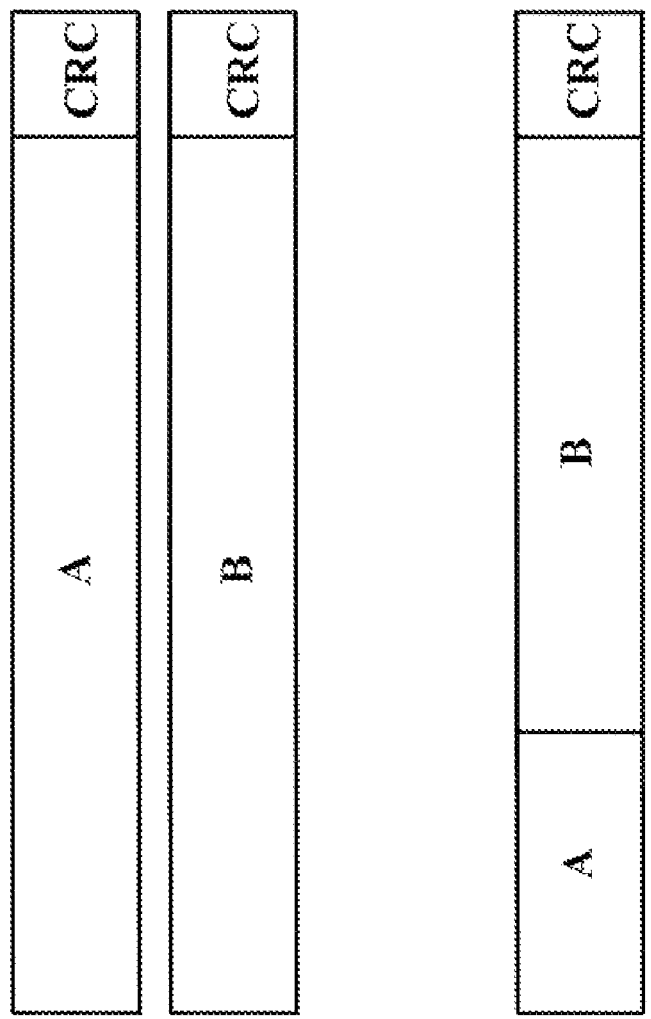
FIG. 6 is an illustration of example transmission structures for communicating power control commands to access terminal groups.

Turning to FIG. 6, illustrated are example transmission structures for communicating power control commands to access terminal groups. For example, the transmission structures can be employed for PDCCH transmissions. Two example transmission structures are depicted (e.g., transmission structure 600 and transmission structure 602); however, it is contemplated that the claimed subject matter is not limited to these examples. Transmission structures 600 and 602 can reduce overhead by grouping power control commands for multiple users into each PDCCH transmission. As illustrated, transmission structure 600 groups power control commands for users in group A upon a first PDCCH transmission and power control commands for users in group B upon a second PDCCH transmission. Further, both the first and second PDCCH transmissions include a cyclic redundancy check (CRC). Moreover, transmission structure 602 combines power control commands for users in groups A and B upon a common PDCCH transmission. By way of illustration, for transmission structure 602, power control commands for users in group A can be included in a first segment of the common PDCCH transmission and power control commands for users in group B can be included in a second segment of the common PDCCH transmission.

Figure 7:
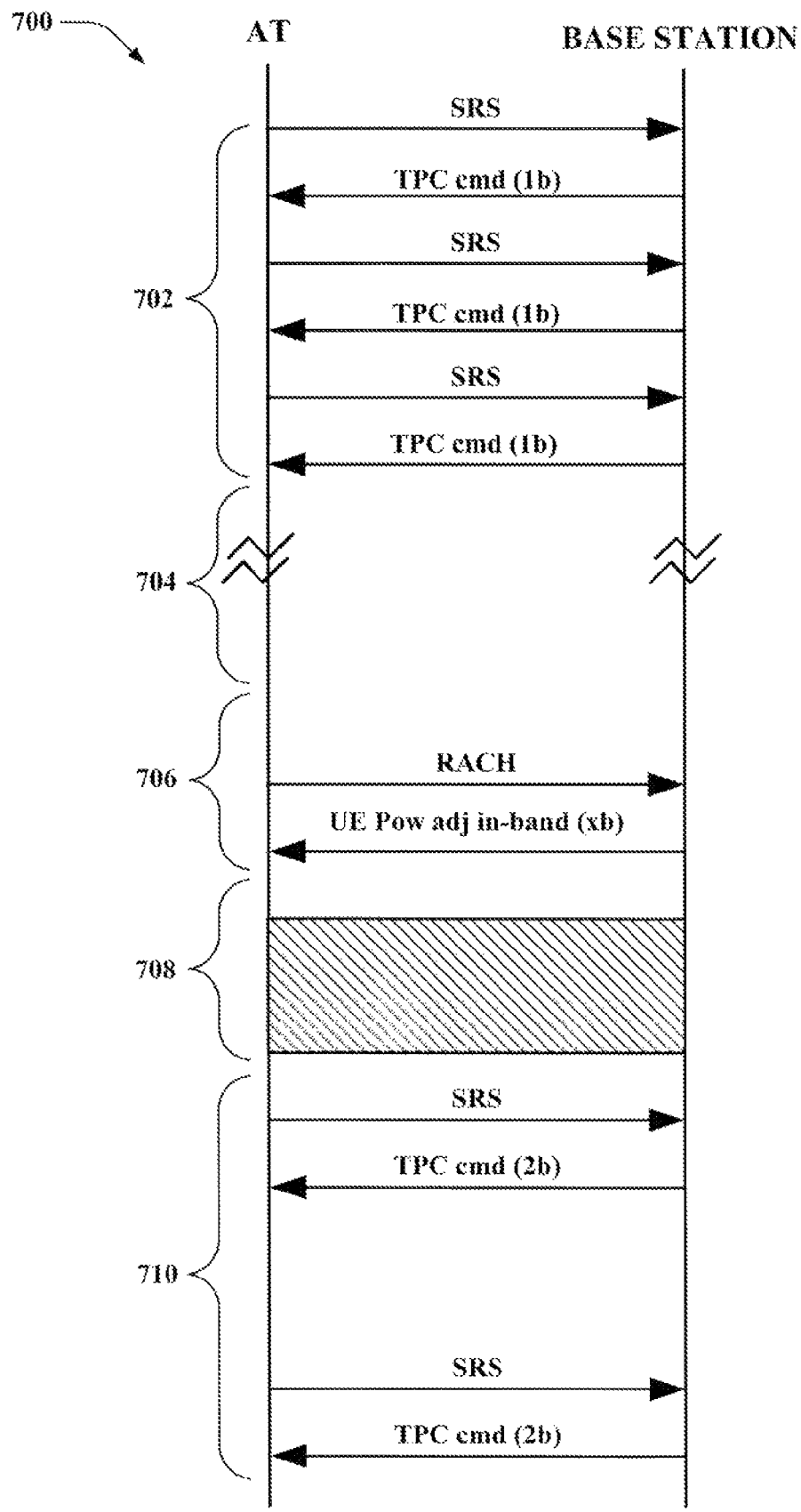
FIG. 7 is an illustration of an example timing diagram for aperiodic uplink power control procedure for LTE.

Referring to FIG. 7, illustrated is an example timing diagram 700 for a periodic uplink power control procedure for LTE. At 702, power control procedures for an access terminal in LTE_ACTIVE state are illustrated. In this state, the access terminal sends periodic SRS transmissions to a base station, and the base station replies to the periodic SRS transmissions with periodic TPC commands. As shown in the illustrated example, the transmit power of the access terminal is corrected by a single TPC bit transmitted periodically on the downlink. It is to be noted that the periodic SRS transmissions can be replaced by periodic CQI transmissions, periodic PUCCH transmissions, and the like. Periodic CQI transmissions or periodic PUCCH transmissions may be less efficient from a channel sounding standpoint since these transmissions may not span the entire system band; however, such transmissions can be leveraged for closed loop corrections based on UL measurements at the base station.

At 704, an inactivity period for the access terminal is depicted. After the inactivity period (e.g., predetermined or use of a threshold period), the access terminal is transitioned to an LTE_ACTIVE_CPC substate. In this substate, the PHY UL resources are de-allocated from the access terminal; accordingly, it may not be possible to use closed loop power control when UL transmissions resume.

At 706, the access terminal resumes uplink transmissions. The RACH is employed to resume uplink transmissions using an open loop estimate. Pursuant to an example, the open loop estimate can be modified in according to a last transmission power with some forgetting factor if deemed beneficial. In response to the RACH sent by the access terminal, the base station can transmit an in-band power adjustment for the access terminal (e.g., x bit power adjustment, where x can be substantially any integer).

At 708, an identity of the access terminal can be verified through the RACH procedure. Further, PHY UL resource re-allocation can be effectuated (e.g., along with SRS configuration) at 708.

At 710, the access terminal is in LTE_ACTIVE state. Hence, the access terminal resumes periodic transmissions of the SRS. As depicted, the periodicity of the periodic SRS transmissions at 710 differ from the periodicity of the periodic SRS transmissions at 702; however, the claimed subject matter is not so limited. In response to the periodic SRS transmissions, the base station sends TPC commands that in this case account for 2 bits (e.g., ±1 dB, ±2 dB). Further, although not illustrated, access terminal transmissions can continue to utilize open loop corrections determined from the receive power level at the access terminal. Therefore, the closed loop corrections can be exclusive and/or on top of the open loop corrections determined from the changes in the receive power at the access terminal.

Figure 8:
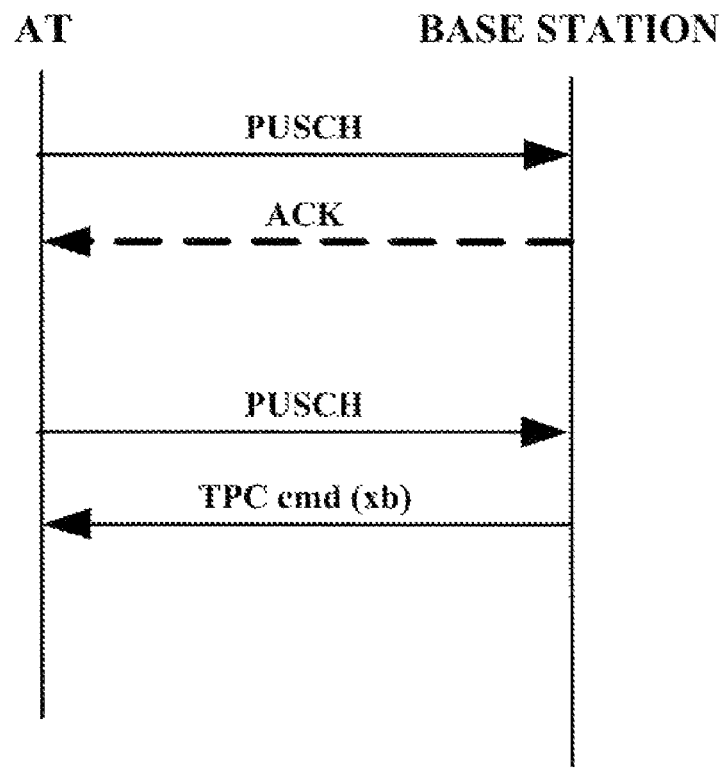
FIG. 8 is an illustration of an example timing diagram for an aperiodic uplink power control procedure for LTE.

Now turning to FIG. 8, illustrated is an example timing diagram 800 for an aperiodic uplink power control procedure for LTE. Illustrated are power control procedures for an access terminal in LTE_ACTIVE state. Timing diagram 800 can lack periodic uplink transmissions. Further, power corrections can be sent from a base station to the access terminal based on power received over the PUSCH. The base station evaluates PUSCH transmissions to determine whether to effectuate a power adjustment. Aperiodic power adjustments can be relied upon where the base station sends a message (e.g., TPC command on UL grant) to the access terminal if a power adjustment is deemed to be needed by the base station upon evaluation of a particular PUSCH transmission. When the base station determines that such power adjustment is not necessary at a particular time for a given PUSCH transmission, the base station need not transmit a TPC command at such time in response to the given PUSCH transmission (e.g., rather, an ACK can be transmitted in response to the given PUSCH transmission . . . ). Moreover, regardless whether a TPC command is obtained by the access terminal at a given time, the access terminal can constantly rely on corrections based on an open loop mechanism. Further, the corrections sent by the base station can be single bit and/or multi-bit corrections.

It is to be appreciated that a similar scheme can be employed with periodic UL transmissions where corrections can be sent on the DL on an as needed basis. Thus, the access terminal can periodically send SRS transmissions on the uplink, which can be evaluated by the base station to determine power adjustments to be effectuated. Thereafter, upon determining that a power adjustment is needed at a particular time, the base station can send a TPC command over the downlink to the access terminal (e.g., aperiodic downlink transmission of power control commands).

The uplink power control procedures depicted in FIGS. 7 and 8 include common aspects. Namely, the notion of ΔPSD (Delta Power Spectral Density) used for the UL data transmissions can be employed for both periodic and aperiodic uplink power control. The ΔPSD can provide a maximum transmit power that is allowed for a given user in order to minimize an impact to adjacent cells. The ΔPSD can evolve over time as a function of, for example, the load indicator from adjacent cells, channel conditions, and so forth. Further, the ΔPSD can be reported to the access terminal (e.g., in-band) when possible. In the LTE systems, the network can choose which MCS/Max data-to-pilot power ratio the access terminal is allowed to transmit. The initial ΔPSD, however, can be based on the MCS in the UL grant (e.g., relationship between the UL grant and the initial ΔPSD can be formula based). Moreover, much of the aforementioned relates to intra-cell power control. Other mechanisms for inter-cell power control (e.g., load control) can be complementary to the mechanisms described herein.

According to another illustration, periodic and aperiodic uplink power control procedures can operate in combination. Following this illustration, periodic updates can be utilized on top of aperiodic updates. If there are scheduled PUSCH transmissions, they can require corresponding PDCCH transmissions with the UL grant, and therefore, the power control commands can be transmitted in the PDCCHs with the UL grants. If the PDCCH is not available, for instance, for persistent UL transmissions (e.g., not requiring the UL grants because the PHY resources are configured by higher layers), then power control commands can be transmitted on TPC-PDDCH1. Also, if there are scheduled PDSCH on the DL, then the power controlling of PUCCH (e.g., CQI and ACK/NAK) can become more critical. In such a case, the power control commands for PUCCH can be communicated on the PDCCHs with the DL assignments. For DL transmissions without associated control or for the case of no DL data activity, the periodic transmissions on TPC-DPCCH2 can be used to power control PUCCH. Accordingly, power control commands can be transmitted when needed (e.g., aperiodically) while making use of available resources (e.g., PDCCH with UL grants for PUSCH, PDCCH with DL assignments for PUCCH, periodic TPC commands on TPC-PDCCH which can be relevant for PUCCH and persistently scheduled PUSCH, . . . ).

Figure 9:
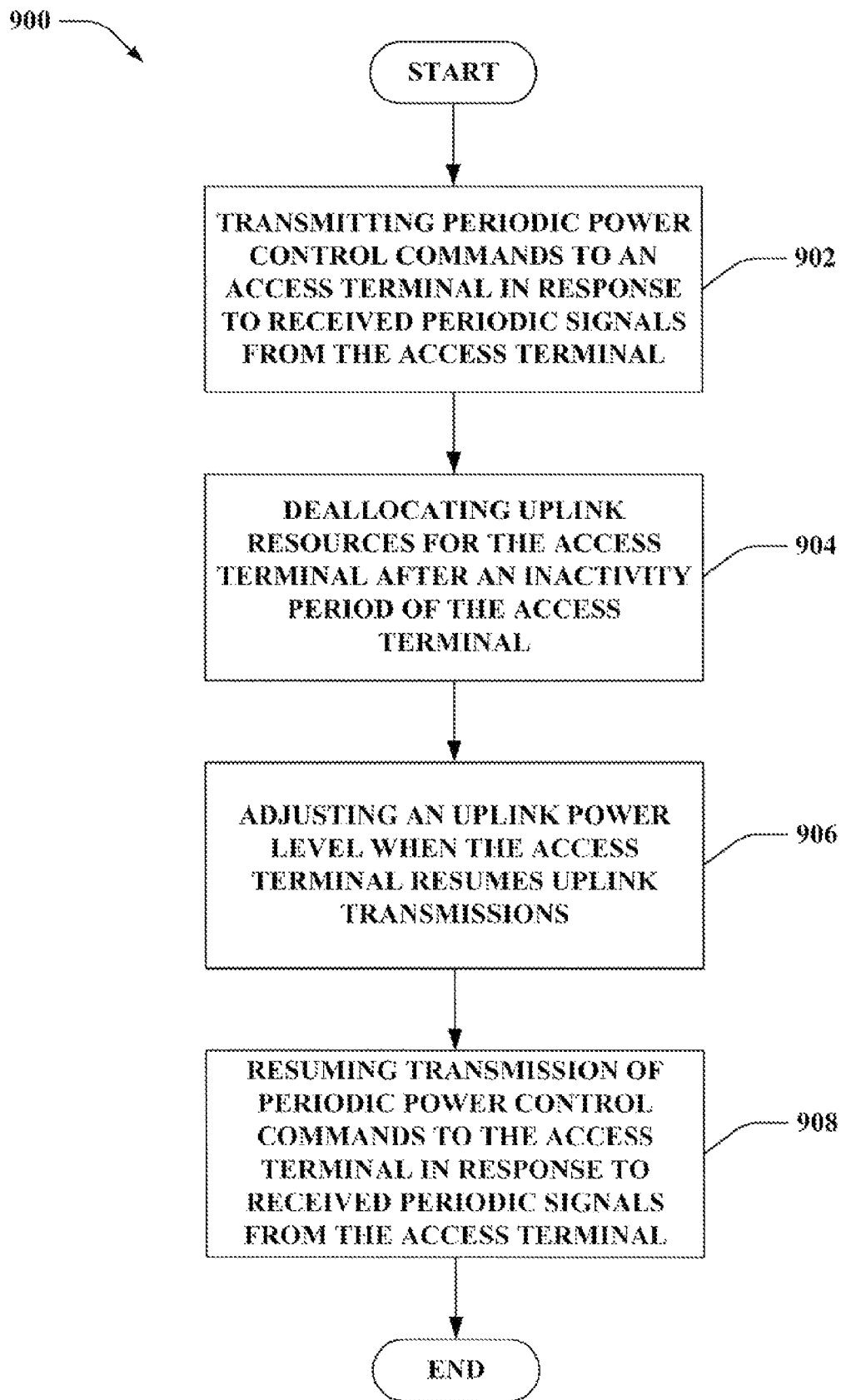
FIG. 9 is an illustration of an example methodology that facilitates generating periodic power control commands in a wireless communication environment.
Figure 10:
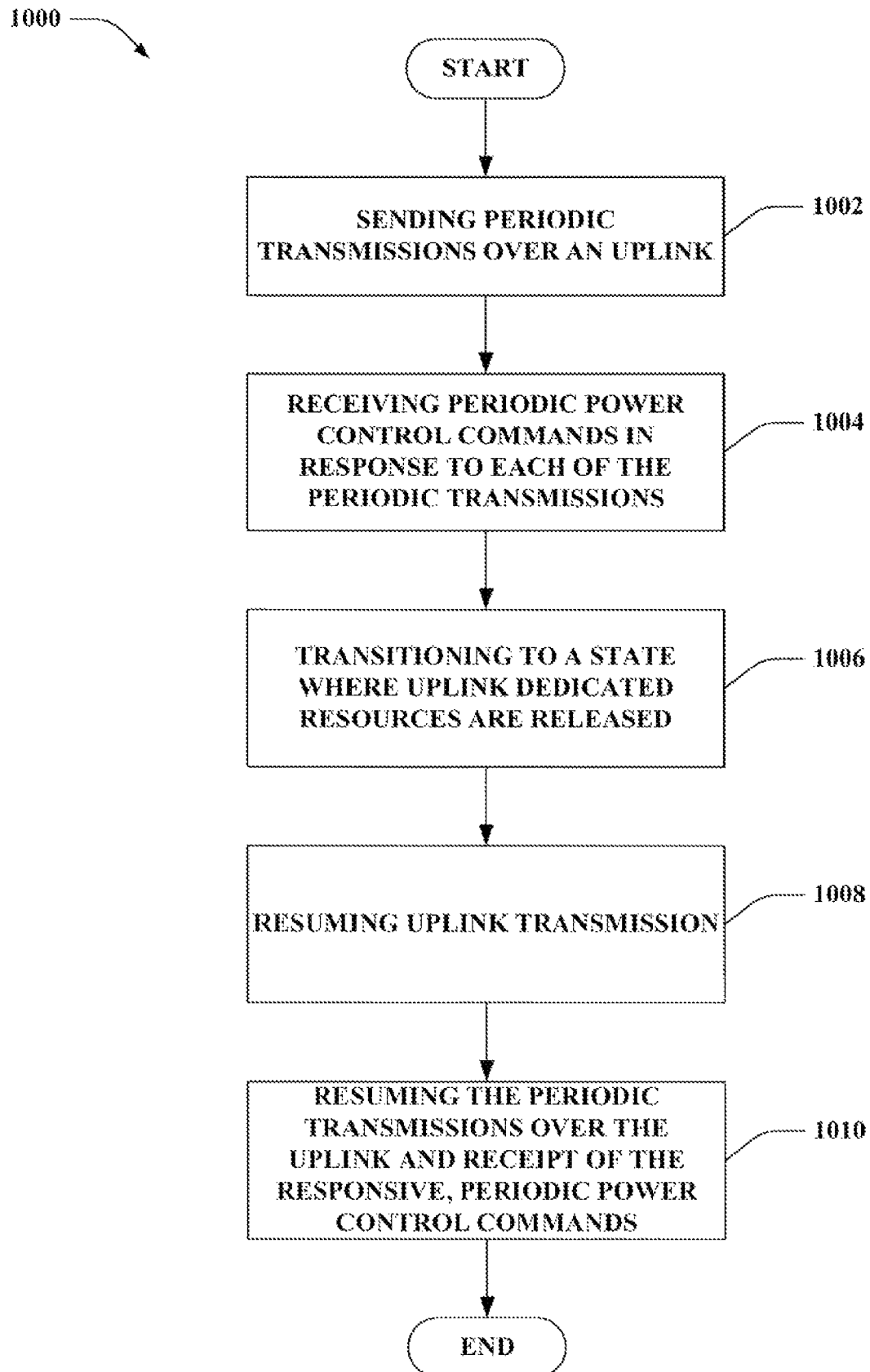
FIG. 10 is an illustration of an example methodology that facilitates utilizing periodic power control commands in a wireless communication environment.

Referring to FIGS. 9-10, methodologies relating to controlling uplink power employing periodic corrections in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 9, illustrated is a methodology 900 that facilitates generating periodic power control commands in a wireless communication environment (e.g., LTE based wireless communication environment). At 902, periodic power control commands can be transmitted to an access terminal in response to received periodic signals from the access terminal. For instance, each periodic control command can be responsive to a respective, received periodic signal. Further, a frequency of the periodic power control commands can equal a frequency of the received periodic signals, for example. The periodic power control commands can be single-bit corrections (e.g., up/down, ±1 dB, . . . ) and/or multi-bit corrections (e.g., ±1 dB, ±2 dB, ±3 dB, ±4 dB, . . . ). Thus, the power control step and the frequency of corrections can determine a maximum rate of change of uplink power that a base station can control. Additionally, when the periodic power control commands are sent at a higher frequency, single-bit corrections can be more likely to be employed, and vice versa. The received periodic signals can be periodic Sounding Reference Signal (SRS) transmissions, for example; however, it is contemplated that the received periodic signals can be periodic Channel Quality Indicator (CQI) transmissions, periodic Physical Uplink Control Channel (PUCCH) transmissions, and the like. The received periodic signals can allow for sampling of an entire system bandwidth to enable adequate correction of path loss and shadowing effects irrespective of the access terminal transmission bandwidth at a given time. Further, the periodic power control commands can be generated based upon the received periodic signals (e.g., utilizing the sampling of the entire bandwidth, . . . ). Moreover, transmission of the periodic power control commands to the access terminal (and reception of the periodic signals from the access terminal) can occur while the access terminal is in LTE_ACTIVE state. By way of another example, transmission of the periodic power control commands can be effectuated on a Physical Downlink Control Channel (PDCCH) (or a particular instantiation of the PDCCH referred to as a Common Power Control Channel (CPCCH) or a Transmission Power Control-Physical Downlink Control Channel (TPC-PDCCH)) or by in-band signaling. According to a further example, disparate access terminals can be grouped with the access terminal, and periodic power control commands directed to access terminals in the group can be sent on the downlink via a common PDCCH (or CPCCH or TPC-PDCCH) transmission. Following this example, grouping can be based upon Discontinuous Reception (DRX) cycle and phase, received periodic signal frequency, Grade of Service (GoS) requirements, and so forth.

At 904, uplink resources for the access terminal can be deallocated after an inactivity period of the access terminal. For instance, the inactivity period can be predetermined or a threshold amount of time of inactivity by the access terminal. Further, the access terminal can be transitioned to an LTE_ACTIVE_CPC (Continuous Packet Connectivity) substate. At 906, an uplink power level can be adjusted when the access terminal resumes uplink transmissions. For instance, the access terminal can resume uplink transmissions by initiating random access. The access terminal can employ an open loop estimate of the uplink power level when initiating the random access; the estimate can, but need not, be modified according to a last uplink power level employed prior to deallocation of the uplink resources. Moreover, the access terminal can be verified through resuming uplink transmissions and uplink resources can be re-allocated to the access terminal. At 908, transmission of periodic power control commands to the access terminal in response to received periodic signals from the access terminal can be resumed. Frequency of the resumed periodic power control command transmissions (and corresponding received periodic signals) can be substantially similar to or different from the frequency of the periodic power control commands (and corresponding received periodic signals) prior to deallocation of the uplink resources (e.g., frequency at 902). According to a further example, periodic and aperiodic power control can operate jointly. Thus, for instance, aperiodic power control commands can be transmitted to the access terminal when needed while the allocation/deallocation of the periodic power control commands can be linked to existence of periodic uplink transmissions. By way of a further illustration, aperiodic power control commands can be transmitted to the access terminal, where the aperiodic power control commands can complement the periodic power control commands and can be based on aperiodic transmissions on an uplink data channel (e.g., PUSCH).

Now turning to FIG. 10, illustrated is a methodology 1000 that facilitates utilizing periodic power control commands in a wireless communication environment (e.g., LTE based wireless communication environment). At 1002, periodic transmissions can be sent over an uplink. The periodic transmissions can be periodic Sounding Reference Signal (SRS) transmissions. According to another illustration, the periodic transmissions can be periodic Channel Quality Indicator (CQI) transmissions, periodic Physical Uplink Control Channel (PUCCH) transmissions, and so forth. The periodic transmissions can be sent over the uplink at respective uplink power levels, the respective uplink power levels being adjusted based upon responsive, periodic power control commands as described below. Further, the periodic transmissions can enable sampling of an entire system bandwidth irrespective of access terminal transmission bandwidth at a given time. Moreover, the periodic transmissions can be sent while the access terminal is in an LTE_ACTIVE state.

At 1004, periodic power control commands can be received in response to each of the periodic transmissions. Each of the periodic power control commands can be employed to alter the uplink power level utilized for a subsequent uplink transmission. The periodic power control commands can include single-bit corrections (e.g., up/down, ±1 dB, ...) and/or multi-bit corrections (e.g., ±1 dB, ±2 dB, ±3 dB, ±4 dB, ...). Moreover, the periodic power control commands can be received via a Physical Downlink Control Channel (PDCCH) (or a particular instantiation of the PDCCH referred to as a Common Power Control Channel (CPCCH) or a Transmission Power Control-Physical Downlink Control Channel (TPC-PDCCH)) or by in-band signaling. According to a further example, the periodic power control commands can be received as part of PDCCH (e.g., TPC-PDCCH) transmissions allocated to a group to which the access terminal is associated. One or more access terminals (including the receiving access terminal) can be grouped together based upon Discontinuous Reception (DRX) cycle and phase, received periodic signal frequency, Grade of Service (GoS) requirements, and so forth.

At 1006, transitioning to a state where uplink dedicated resources are released can be effectuated. For instance, the state can be an LTE_ACTIVE_CPC (Continuous Packet Connectivity) substate. Moreover, transitioning can occur in response to an inactivity period, where the inactivity period can be predetermined or a threshold amount of time of inactivity by the access terminal. At 1008, uplink transmission can be resumed. For instance, a Random Access Channel (RACH) transmission can be transferred over the uplink. Moreover, since uplink resources are de-allocated from the access terminal and closed loop power control mechanisms may not be available, an open loop estimate can be employed at the resuming of the uplink transmission. Pursuant to a further example, the open loop estimate can be modified by a last transmission power with a forgetting factor. At 1010, the periodic transmissions over the uplink and receipt of the responsive, periodic power control commands can be resumed. Resuming of the periodic transmissions can occur after access terminal verification through a RACH procedure and uplink resource re-allocation. Frequency of the resumed periodic transmissions (and corresponding received periodic power control commands) can be substantially similar to or different from the frequency of the periodic transmissions (and corresponding received periodic power control commands) prior to deallocation of the uplink resources. According to a further illustration, periodic and aperiodic power control can operate jointly. Thus, for instance, aperiodic power control commands can be received over the downlink (e.g., when determined to be needed) while the allocation/deallocation of the periodic power control commands can be linked to existence of periodic uplink transmissions. By way of a further example, aperiodic power control commands can be received over the downlink, where the aperiodic power control commands can complement the periodic power control commands and can be based on aperiodic transmissions on an uplink data channel (e.g., PUSCH).

It will be appreciated that, in accordance with one or more aspects described herein, inferences can be made regarding employing periodic power control commands. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining how to optimize downlink efficiency as a function of formation of user groups for communicating periodic power control commands over shared downlink resources. By way of further illustration, an inference can be made related to determining a frequency to be employed for transferring periodic transmissions over an uplink. It will be appreciated that the foregoing examples are illustrative in nature and are not intended to limit the number of inferences that can be made or the manner in which such inferences are made in conjunction with the various embodiments and/or methods described herein.

Figure 11:
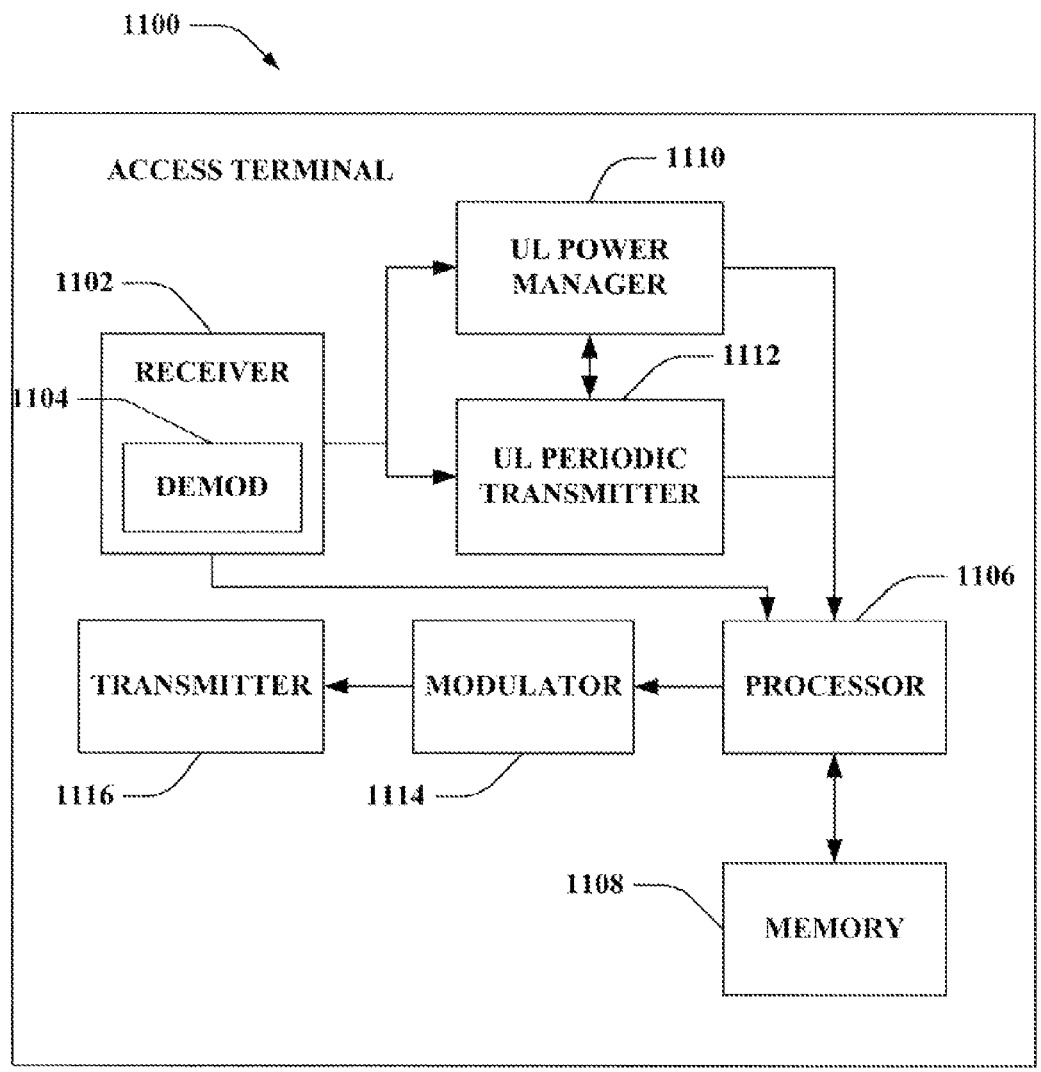
FIG. 11 is an illustration of an example access terminal that facilitates utilizing periodic power control commands in an LTE based wireless communication system.

FIG. 11 is an illustration of an access terminal 1100 that facilitates utilizing periodic power control commands in an LTE based wireless communication system. Access terminal 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of access terminal 1100, and/or a processor that both analyzes information received by receiver 1102, generates information for transmission by transmitter 1116, and controls one or more components of access terminal 1100.

Access terminal 1100 can additionally comprise memory 1108 that is operatively coupled to processor 1106 and that can store data to be transmitted, received data, identifier(s) assigned to access terminal 1100, information related to obtained periodic power control commands, and any other suitable information for selecting whether to implement the periodic power control commands. Memory 1108 can additionally store protocols and/or algorithms associated with deciphering whether a periodic power control command is directed towards access terminal 1100.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to an UL power manager 1110 that controls a power level utilized by access terminal 1100 for transmitting via an uplink. UL power manager 1110 can set the uplink power level for transmitting data, control signals, and so forth via any type of uplink channel. UL power manager 1110 can employ open loop mechanisms for selecting the uplink power level. Additionally UL power manager 1110 can evaluate periodic power control commands obtained by receiver 1102. Further, UL power manager 1110 alters the uplink power level utilized by access terminal 1100 as a function of the periodic power control commands. Additionally, receiver 1102 and UL power manager 1110 can be coupled to an UL periodic transmitter 1112 that enables sending periodic transmissions over the uplink. The periodic transmissions generated by UL periodic transmitter 1112 can be transferred to enable sampling the entire system bandwidth, and the periodic power control commands can be received in response to the periodic transmissions yielded by UL periodic transmitter 1112. Access terminal 1100 still further comprises a modulator 1114 and a transmitter 1116 that transmits the signal to, for instance, a base station, another access terminal, etc. Although depicted as being separate from the processor 1106, it is to be appreciated that UL power manager 1110, UL periodic transmitter 1112 and/or modulator 1114 can be part of processor 1106 or a number of processors (not shown).

Figure 12:
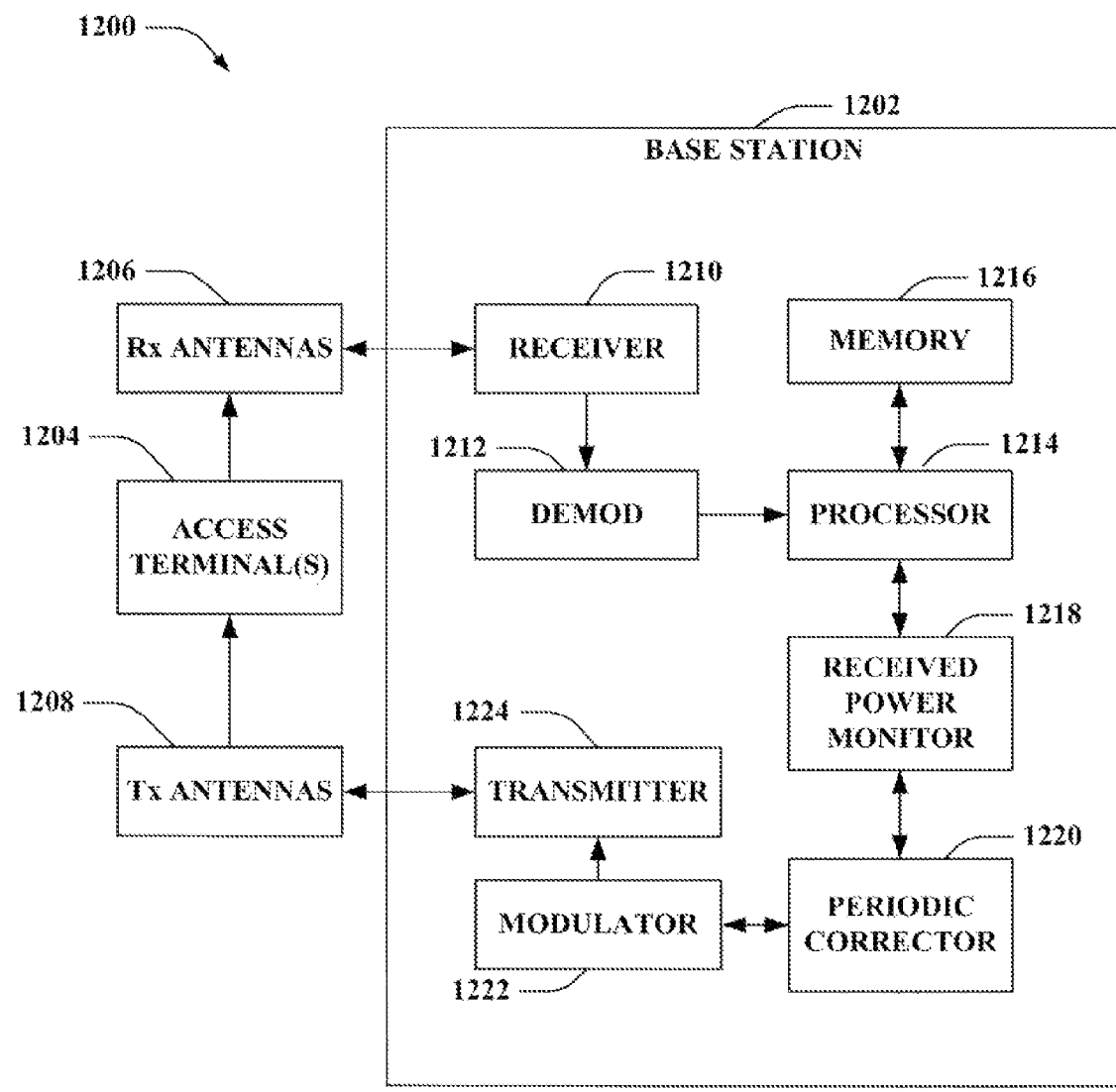
FIG. 12 is an illustration of an example system that facilitates yielding periodic power control commands in an LTE based wireless communication environment.

FIG. 12 is an illustration of a system 1200 that facilitates yielding periodic power control commands in an LTE based wireless communication environment. System 1200 comprises a base station 1202 (e.g., access point, . . . ) with a receiver 1210 that receives signal(s) from one or more access terminals 1204 through a plurality of receive antennas 1206, and a transmitter 1222 that transmits to the one or more access terminals 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to access terminal identifiers (e.g., MACIDs, . . . ), data to be transmitted to or received from access terminal(s) 1204 (or a disparate base station (not shown)) (e.g., periodic power control command(s) . . . ), and/or any other suitable information related to performing the various actions and functions set forth herein. Processor 1214 is further coupled to a received power monitor 1218 that assesses uplink power levels employed by access terminal(s) 1204 based upon periodic uplink transmissions obtained at base station 1202. For instance, received power monitor 1218 can analyze an uplink power level from aperiodic SRS transmission; however, the claimed subject matter is not so limited as any periodic uplink transmission can be evaluated by received power monitor 1218.

Received power monitor 1218 can be operatively coupled to aperiodic corrector 1220 that generates periodic power control commands. According to an illustration, for each periodic uplink transmission analyzed by received power monitor 1218, a corresponding periodic power control command can be yielded by periodic corrector 1220. Periodic corrector 1220 can additionally be operatively coupled to a modulator 1222. Modulator 1222 can multiplex periodic power control commands for transmission by a transmitter 1226 through antenna 1208 to access terminal(s) 1204. Although depicted as being separate from the processor 1214, it is to be appreciated that received power monitor 1218, periodic corrector 1220 and/or modulator 1222 can be part of processor 1214 or a number of processors (not shown).

Figure 13:
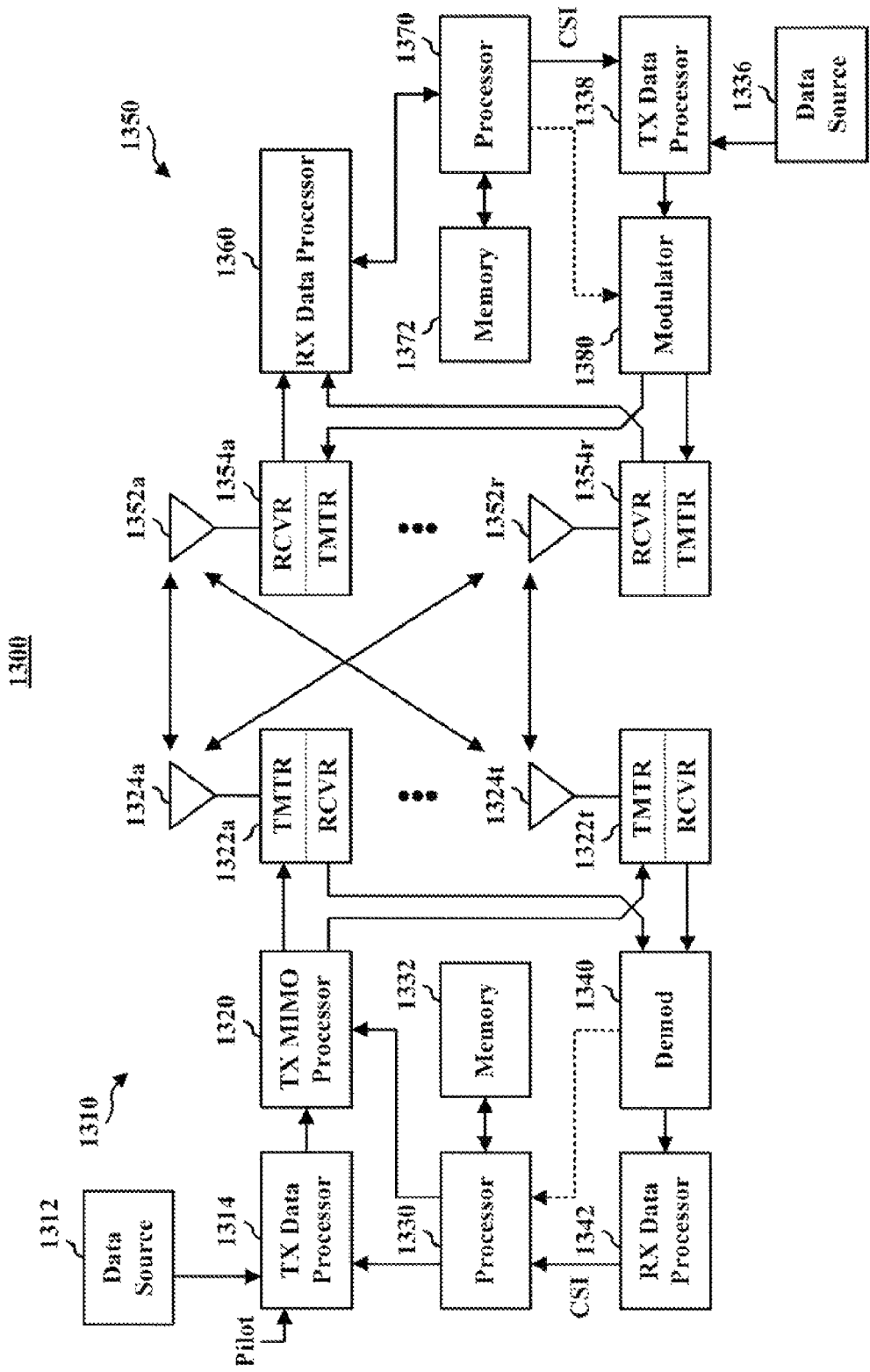
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-5, 11-12, and 14-15) and/or methods (FIGS. 9-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
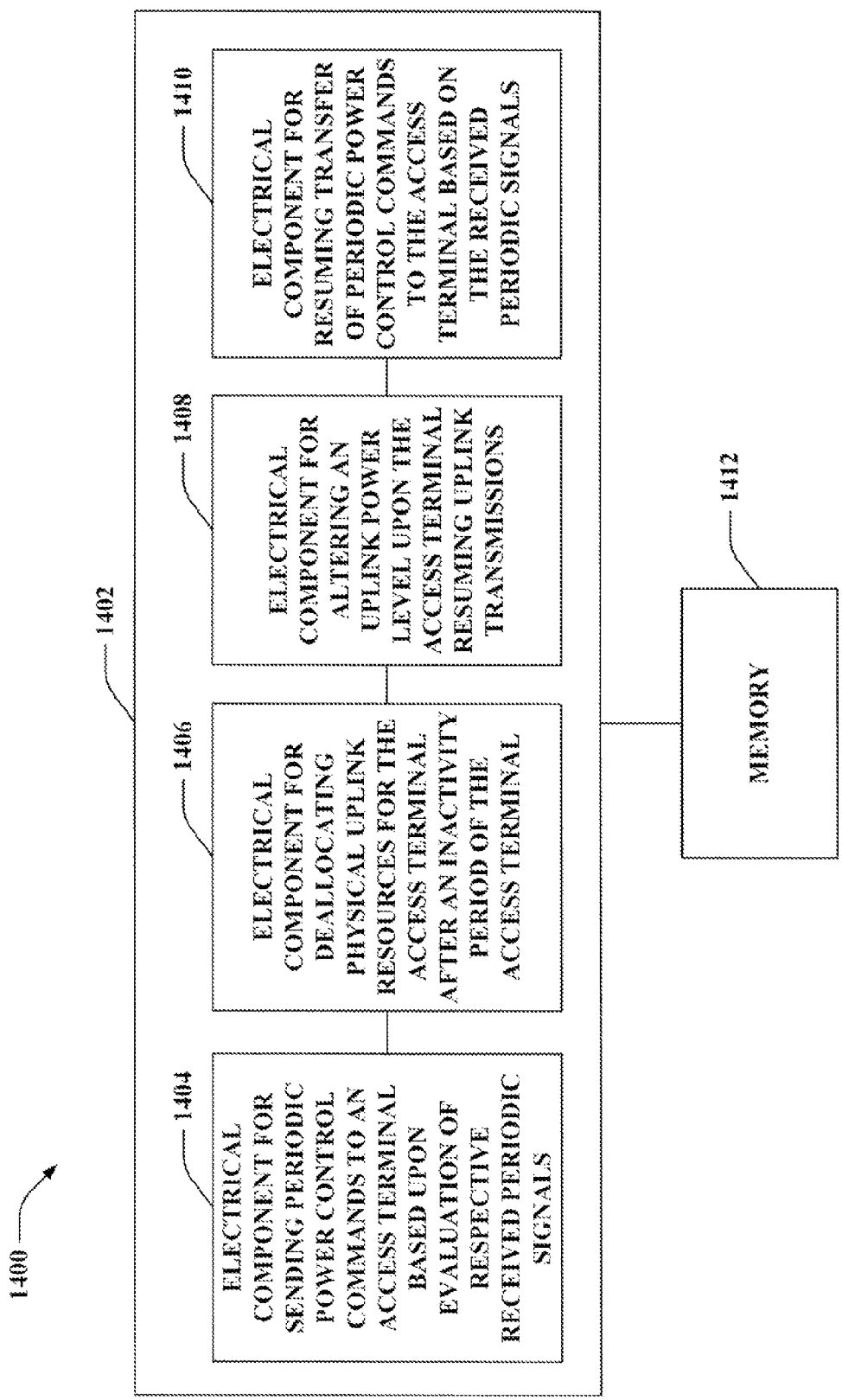
FIG. 14 is an illustration of an example system that enables yielding periodic power control commands for utilization by access terminals in a wireless communication environment.

With reference to FIG. 14, illustrated is a system 1400 that enables yielding periodic power control commands for utilization by access terminals in a wireless communication environment. For example, system 1400 can reside at least partially within a base station. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for sending periodic power control commands to an access terminal based upon evaluation of respective received periodic signals 1404. Further, the logical grouping 1402 can comprise an electrical component for deallocating physical uplink resources for the access terminal after an inactivity period of the access terminal 1406. Moreover, the logical grouping 1402 can include an electrical component for altering an uplink power level upon the access terminal resuming uplink transmissions 1408. Also, the logical grouping 1402 can include an electrical component for resuming transfer of periodic power control commands to the access terminal based on the received periodic signals 1410. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
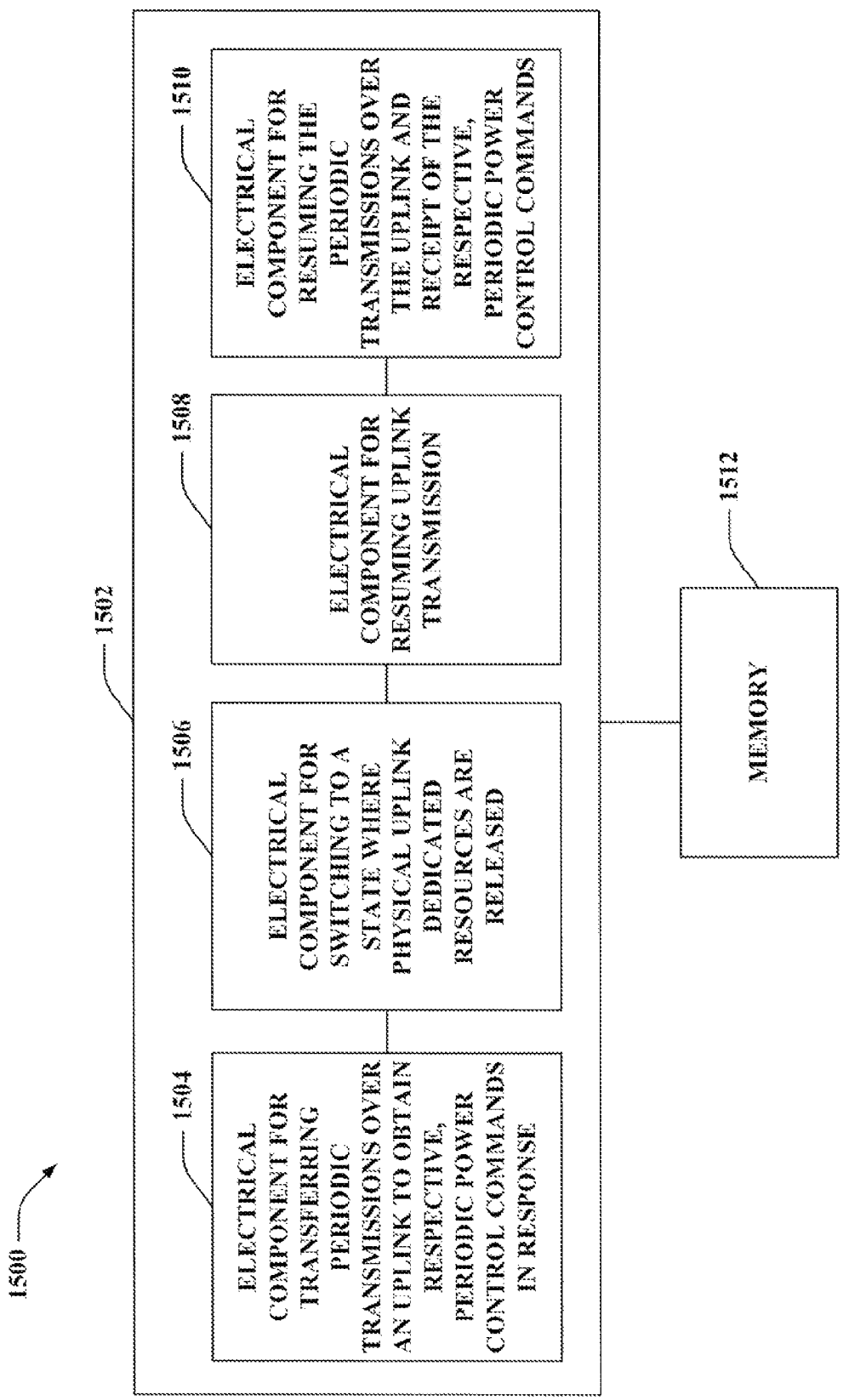
FIG. 15 is an illustration of an example system that enables utilizing periodic power control commands in a wireless communication environment.

Turning to FIG. 15, illustrated is a system 1500 that enables utilizing periodic power control commands in a wireless communication environment. System 1500 can reside within an access terminal, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for transferring periodic transmissions over an uplink to obtain respective, periodic power control commands in response 1504. Moreover, logical grouping 1502 can include an electrical component for switching to a state where physical uplink dedicated resources are released 1506. Further, logical grouping 1502 can comprise an electrical component for resuming uplink transmission 1508. Logical grouping 1502 can also include an electrical component for resuming the periodic transmissions over the uplink and receipt of the respective, periodic power control commands 1510. Additionally, system 1500 can include a memory 1512 that retains instructions for executing functions associated with electrical components 1504, 1506, 1508, and 1510. While shown as being external to memory 1512, it is to be understood that electrical components 1504, 1506, 1508, and 1510 can exist within memory 1512.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates generating periodic power control commands in a wireless communication environment, comprising:
   transmitting periodic power control commands to an access terminal in response to received periodic signals from the access terminal;
   deallocating uplink resources for the access terminal after an inactivity period of the access terminal;
   adjusting an uplink power level when the access terminal resumes uplink transmissions; and
   resuming transmission of periodic power control commands to the access terminal in response to received periodic signals from the access terminal.

2. The method of claim 1, wherein the periodic power control commands each include a single-bit correction.

3. The method of claim 1, wherein the periodic power control commands each include a multi-bit correction.

4. The method of claim 1, wherein the received periodic signals are periodic Sounding Reference Signal (SRS) transmissions.

5. The method of claim 1, wherein the received periodic signals are periodic Physical Uplink Control Channel (PUCCH) transmissions.

6. The method of claim 1, further comprising:
   sampling a wireless communication system bandwidth based upon the received periodic signals irrespective of a transmission bandwidth of the access terminal at a given time; and
   generating the periodic power control commands based upon the sampling of the wireless communication system bandwidth.

7. The method of claim 1, further comprising transmitting the periodic power control commands on a Physical Downlink Control Channel (PDCCH).

8. The method of claim 1, further comprising transmitting the periodic power control commands via in-band signaling.

9. The method of claim 1, further comprising:
   grouping the access terminal with at least one disparate access terminal; and
   transmitting periodic power control commands to access terminals in the group via a common Transmission Power Control-Physical Downlink Control Channel (TPC-PDCCH) transmission.

10. The method of claim 9, further comprising grouping the access terminal with at least one disparate access terminal based upon one or more of Discontinuous Reception (DRX) cycle, DRX phase, received periodic signal frequency, or Grade of Service (GoS) requirements.

11. The method of claim 1, wherein the inactivity period is at least one of predetermined or a threshold amount of time of inactivity by the access terminal.

12. The method of claim 1, further comprising:
   verifying the access terminal through the resuming of the uplink transmissions; and
   re-allocating the uplink resources to the access terminal.

13. The method of claim 1, wherein a frequency of the resumed transmission of periodic power control commands differs from a frequency of the periodic power control commands prior to deallocation of the uplink resources.

14. The method of claim 1, wherein a frequency of the resumed transmission of periodic power control commands is substantially similar to a frequency of the periodic power control commands prior to deallocation of the uplink resources.

15. The method of claim 1, further comprising transmitting aperiodic power control commands to the access terminal when needed while allocation and deallocation of the periodic power control commands are linked to existence of received periodic signals from the access terminal.

16. The method of claim 1, further comprising transmitting aperiodic power control commands to the access terminal, the aperiodic power control commands complement the periodic power control commands and are based on aperiodic transmissions on an uplink data channel.

17. A wireless communications apparatus, comprising:
a memory that retains instructions related to sending periodic power control commands to an access terminal in response to received periodic uplink transmissions from the access terminal, deallocating uplink resources for the access terminal after an inactivity period of the access terminal, controlling alteration of an uplink power level upon resuming of uplink transmissions from the access terminal, and resuming transfer of periodic power control commands to the access terminal in response to received periodic uplink transmissions from the access terminal; and
a processor, coupled to the memory, configured to execute the instructions retained in the memory.

18. The wireless communications apparatus of claim 17, wherein the received periodic uplink transmissions are periodic Sounding Reference Signal (SRS) transmissions.

19. The wireless communications apparatus of claim 17, wherein the received periodic uplink transmissions are periodic Physical Uplink Control Channel (PUCCH) transmissions.

20. The wireless communications apparatus of claim 17, wherein the memory further retains instruction related to sampling an overall system bandwidth based upon the received periodic uplink transmissions irrespective of a transmission bandwidth of the access terminal at a given time and generating the periodic power control commands based upon the sampling of the overall system bandwidth.

21. The wireless communications apparatus of claim 17, wherein the memory further retains instruction related to sending the periodic power control commands on a Physical Downlink Control Channel (PDCCH).

22. The wireless communications apparatus of claim 17, wherein the memory further retains instruction related to sending the periodic power control commands via in-band signaling.

23. The wireless communications apparatus of claim 17, wherein the memory further retains instruction related to grouping the access terminal with at least one disparate access terminal based upon one or more of Discontinuous Reception (DRX) cycle, DRX phase, received periodic uplink transmission frequency, or Grade of Service (GoS) requirements.

24. The wireless communications apparatus of claim 23, wherein the memory further retains instruction related to sending periodic power control commands to access terminals in the group via a common Transmission Power Control-Physical Downlink Control Channel (TPC-PDCCH) transmission.

25. The wireless communications apparatus of claim 17, wherein the inactivity period is at least one of predetermined or a threshold amount of time of inactivity by the access terminal.

26. The wireless communications apparatus of claim 17, wherein the memory further retains instruction related to verifying the access terminal through the resuming of the uplink transmissions and re-allocating the uplink resources to the access terminal.

27. The wireless communications apparatus of claim 17, wherein a frequency of the resumed transfer of periodic power control commands differs from a frequency of the periodic power control commands prior to deallocation of the uplink resources.

28. The wireless communications apparatus of claim 17, wherein the memory further retains instructions related to sending aperiodic power control commands to the access terminal while allocation and deallocation of the periodic power control commands are linked to existence of received periodic uplink transmissions.

29. The wireless communications apparatus of claim 17, wherein the memory further retains instructions related to sending aperiodic power control commands to the access terminal, the aperiodic power control commands complement the periodic power control commands and are based on aperiodic transmissions on an uplink data channel.

30. A wireless communications apparatus that enables yielding periodic power control commands for utilization by access terminals in a wireless communication environment, comprising:
means for sending periodic power control commands to an access terminal based upon evaluation of respective received periodic signals;
means for deallocating physical uplink resources for the access terminal after an inactivity period of the access terminal;
means for altering an uplink power level upon the access terminal resuming uplink transmissions; and
means for resuming transfer of periodic power control commands to the access terminal based on the received periodic signals.

31. The wireless communications apparatus of claim 30, wherein the received periodic signals are periodic Sounding Reference Signal (SRS) transmissions.

32. The wireless communications apparatus of claim 30, wherein the received periodic signals are periodic Physical Uplink Control Channel (PUCCH) transmissions.

33. The wireless communications apparatus of claim 30, further comprising:
means for sampling an overall system bandwidth based upon the received periodic signals irrespective of a transmission bandwidth of the access terminal at a particular time; and
means for generating the periodic power control commands based upon the sampling of the overall system bandwidth.

34. The wireless communications apparatus of claim 30, further comprising means for sending the periodic power control commands on a Physical Downlink Control Channel (PDCCH).

35. The wireless communications apparatus of claim 30, further comprising means for sending the periodic power control commands via in-band signaling.

36. The wireless communications apparatus of claim 30, further comprising:
means for grouping the access terminal with at least one disparate access terminal based upon one or more of Discontinuous Reception (DRX) cycle, DRX phase, received periodic signal frequency, or Grade of Service (GoS) requirements; and
means for sending periodic power control commands to access terminals in the group via a common Transmission Power Control-Physical Downlink Control Channel (TPC-PDCCH) transmission.

37. The wireless communications apparatus of claim 30, wherein the inactivity period is at least one of predetermined or a threshold amount of time of inactivity by the access terminal.

38. The wireless communications apparatus of claim 30, wherein a frequency of the resumed transfer of periodic power control commands differs from a frequency of the periodic power control commands prior to deallocation of the physical uplink resources.

39. The wireless communications apparatus of claim 30, further comprising means for sending aperiodic power control commands to the access terminal when needed, the aperiodic power control commands complement the periodic power control commands and are based on aperiodic transmissions on an uplink data channel.

40. A machine-readable medium having stored thereon machine-executable instructions for:
  transmitting periodic power control commands to an access terminal in response to received periodic uplink transmissions from the access terminal;
  deallocating uplink resources for the access terminal after an inactivity period of the access terminal;
  controlling alteration of an uplink power level upon resuming of uplink transmissions from the access terminal; and
  resuming transmission of periodic power control commands to the access terminal in response to received periodic uplink transmissions from the access terminal.

41. The machine-readable medium of claim 40, wherein the received periodic uplink transmissions are periodic Sounding Reference Signal (SRS) transmissions.

42. The machine-readable medium of claim 40, wherein the received periodic uplink transmissions are periodic Physical Uplink Control Channel (PUCCH) transmissions.

43. The machine-readable medium of claim 40, the machine-executable instructions further comprise sampling an overall system bandwidth based upon the received periodic uplink transmissions irrespective of a transmission bandwidth of the access terminal at a particular time, and yielding the periodic power control commands based upon the sampling of the overall system bandwidth.

44. The machine-readable medium of claim 40, the machine-executable instructions further comprise transmitting the periodic power control commands on a Physical Downlink Control Channel (PDCCH).

45. The machine-readable medium of claim 40, the machine-executable instructions further comprise transmitting the periodic power control commands by way of in-band signaling.

46. The machine-readable medium of claim 40, the machine-executable instructions further comprise grouping the access terminal with at least one disparate access terminal based upon one or more of Discontinuous Reception (DRX) cycle, DRX phase, received periodic uplink transmission frequency, or Grade of Service (GoS) requirements, and transmitting periodic power control commands to access terminals in the group via a common Transmission Power Control-Physical Downlink Control Channel (TPC-PDCCH) transmission.

47. The machine-readable medium of claim 40, wherein the inactivity period is at least one of predetermined or a threshold amount of time of inactivity by the access terminal.

48. The machine-readable medium of claim 40, wherein a frequency of the resumed transmission of periodic power control commands differs from a frequency of the periodic power control commands prior to deallocation of the physical uplink resources.

49. The machine-readable medium of claim 40, the machine-executable instructions further comprise transmitting aperiodic power control commands to the access terminal when needed while allocation and deallocation of the periodic power control commands are linked to existence of received periodic uplink transmissions.

50. The machine-readable medium of claim 40, the machine-executable instructions further comprise transmitting aperiodic power control commands to the access terminal, the aperiodic power control commands complement the periodic power control commands and are based on aperiodic transmissions on an uplink data channel.

51. In a wireless communications system, an apparatus comprising:
  a processor configured to:
    transmit periodic power control commands to an access terminal in response to received periodic signals from the access terminal;
    deallocate uplink resources for the access terminal after an inactivity period of the access terminal;
    control adjustment of an uplink power level when the access terminal resumes uplink transmissions; and
    restart transmission of periodic power control commands to the access terminal in response to received periodic signals from the access terminal.

52. A method that facilitates utilizing periodic power control commands in a wireless communication environment, comprising:
  sending periodic transmissions over an uplink;
  receiving periodic power control commands in response to each of the periodic transmissions;
  transitioning to a state where uplink dedicated resources are released;
  resuming uplink transmission; and
  resuming the periodic transmissions over the uplink and receipt of the responsive, periodic power control commands.

53. The method of claim 52, wherein the periodic transmissions are periodic Sounding Reference Signal (SRS) transmissions.

54. The method of claim 52, wherein the periodic transmissions are periodic Physical Uplink Control Channel (PUCCH) transmissions.

55. The method of claim 52, further comprising sending the periodic transmissions over the uplink at respective uplink power levels, the respective uplink power levels being adjusted based upon the responsive, periodic power control commands.

56. The method of claim 52, further comprising receiving the periodic power control commands on a Physical Downlink Control Channel (PDCCH).

57. The method of claim 52, further comprising receiving the periodic power control commands as part of Transmission Power Control-Physical Downlink Control Channel (TPC-PDCCH) transmissions allocated to a group associated with an access terminal, wherein the group includes one or more disparate access terminals in addition to the access terminal.

58. The method of claim 52, further comprising receiving the periodic power control commands via in-band signaling.

59. The method of claim 52, further comprising transitioning to the state where the uplink dedicated resources are released in response to an inactivity period.

60. The method of claim 52, further comprising employing an open loop estimate of a power level at the resuming of the uplink transmission.

61. The method of claim 52, further comprising receiving aperiodic power control commands in addition to the periodic power control commands, the aperiodic power control commands complement the periodic power control commands and are based on aperiodic transmissions on an uplink data channel.

62. A wireless communications apparatus, comprising:
a memory that retains instructions related to transferring periodic transmissions over an uplink, obtaining periodic power control commands each generated based upon the periodic transmissions, transitioning to a state where uplink dedicated resources are released from an access terminal, resuming uplink transmission, and restarting the periodic transmissions over the uplink and receipt of the periodic power control commands; and
a processor, coupled to the memory, configured to execute the instructions retained in the memory.

63. The wireless communications apparatus of claim 62, wherein the periodic transmissions are periodic Sounding Reference Signal (SRS) transmissions.

64. The wireless communications apparatus of claim 62, wherein the periodic transmissions are periodic Physical Uplink Control Channel (PUCCH) transmissions.

65. The wireless communications apparatus of claim 62, wherein the memory further retains instructions related to transferring the periodic transmissions over the uplink at respective uplink power levels, the respective uplink power levels being controlled based upon the periodic power control commands.

66. The wireless communications apparatus of claim 62, wherein the memory further retains instructions related to obtaining the periodic power control commands on a Physical Downlink Control Channel (PDCCH).

67. The wireless communications apparatus of claim 62, wherein the memory further retains instructions related to obtaining the periodic power control commands as part of Transmission Power Control-Physical Downlink Control Channel (TPC-PDCCH) transmissions allocated to a group associated with the access terminal, wherein the group includes one or more disparate access terminals in addition to the access terminal.

68. The wireless communications apparatus of claim 62, wherein the memory further retains instructions related to obtaining the periodic power control commands via in-band signaling.

69. The wireless communications apparatus of claim 62, wherein the memory further retains instructions related to transitioning to the state where the uplink dedicated resources are released based upon an occurrence of an inactivity period.

70. The wireless communications apparatus of claim 62, wherein the memory further retains instructions related to employing an open loop estimate of a power level at the resuming of the uplink transmission.

71. The wireless communications apparatus of claim 62, wherein the memory further retains instructions related to obtaining aperiodic power control commands in addition to the periodic power control commands, the aperiodic power control commands complement the periodic power control commands and are based on aperiodic transmissions on an uplink data channel.

72. A wireless communications apparatus that enables utilizing periodic power control commands in a wireless communication environment, comprising:
means for transferring periodic transmissions over an uplink to obtain respective, periodic power control commands in response;
means for switching to a state where physical uplink dedicated resources are released;
means for resuming uplink transmission; and
means for resuming the periodic transmissions over the uplink and receipt of the respective, periodic power control commands.

73. The wireless communications apparatus of claim 72, wherein the periodic transmissions are periodic Sounding Reference Signal (SRS) transmissions.

74. The wireless communications apparatus of claim 72, wherein the periodic transmissions are periodic Physical Uplink Control Channel (PUCCH) transmissions.

75. The wireless communications apparatus of claim 72, further comprising means for transferring the periodic transmissions over the uplink at respective uplink power levels, the respective uplink power levels being controlled based upon the periodic power control commands.

76. The wireless communications apparatus of claim 72, further comprising means for obtaining the respective, periodic power control commands on a Transmission Power Control-Physical Downlink Control Channel (TPC-PDCCH) as part of TPC-PDCCH transmissions allocated to a group associated with an access terminal.

77. The wireless communications apparatus of claim 72, further comprising means for obtaining the respective, periodic power control commands via in-band signaling.

78. The wireless communications apparatus of claim 72, further comprising means for switching to the state where the physical uplink dedicated resources are released based upon an occurrence of an inactivity period.

79. The wireless communications apparatus of claim 72, further comprising means for estimating a power level to utilize for the resuming of the uplink transmission based at least in part upon an open loop mechanism.

80. The wireless communications apparatus of claim 72, further comprising means for obtaining aperiodic power control commands in addition to the respective, periodic power control commands, the aperiodic power control commands complement the respective, periodic power control commands and are based on aperiodic transmissions on an uplink data channel.

81. A machine-readable medium having stored thereon machine-executable instructions for:
transferring periodic Sounding Reference Signal (SRS) transmissions over an uplink;
obtaining periodic power control commands each generated based upon the periodic transmissions;
transitioning to a state where uplink dedicated resources are released from an access terminal;
resuming uplink transmission; and
restarting the periodic transmissions over the uplink and receipt of the periodic power control commands.

82. The machine-readable medium of claim 81, the machine-executable instructions further comprise transferring the periodic SRS transmissions over the uplink at respective uplink power levels, the respective uplink power levels being controlled based upon the periodic power control commands.

83. The machine-readable medium of claim 81, the machine-executable instructions further comprise obtaining the periodic power control commands on a Transmission Power Control-Physical Downlink Control Channel (TPC-PDCCH) as part of TPC-PDCCH transmissions allocated to a group associated with the access terminal.

84. The machine-readable medium of claim 81, the machine-executable instructions further comprise obtaining the periodic power control commands via in-band signaling.

85. The machine-readable medium of claim 81, the machine-executable instructions further comprise transitioning to the state where the uplink dedicated resources are released based upon an occurrence of an inactivity period.

86. The machine-readable medium of claim 81, the machine-executable instructions further comprise estimating a power level to utilize at the resuming of the uplink transmission based at least in part upon an open loop mechanism.

87. The machine-readable medium of claim 81, the machine-executable instructions further comprise obtaining aperiodic power control commands in addition to the periodic power control commands, the aperiodic power control commands complement the periodic power control commands and are based on aperiodic transmissions on an uplink data channel.

88. In a wireless communications system, an apparatus comprising:
    a processor configured to:
        send periodic transmissions over an uplink;
        receive periodic power control commands in response to each of the periodic transmissions;
        transition to a state where uplink dedicated resources are released;
        resume uplink transmission; and
        resume the periodic transmissions over the uplink and receipt of the responsive, periodic power control commands.

\* \* \* \* \*